(12) United States Patent
Noda et al.

(10) Patent No.: US 7,191,267 B2
(45) Date of Patent: Mar. 13, 2007

(54) ELECTRONIC DEVICE SYSTEM, CONTROLLING DEVICE AND CONTROLLING METHOD

(75) Inventors: Takuro Noda, Tokyo (JP); Yoshiaki Takenaka, Tokyo (JP); Yoshiyuki Takaku, Tokyo (JP); Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 863 days.

(21) Appl. No.: 09/797,872

(22) Filed: Mar. 5, 2001

(65) Prior Publication Data

US 2001/0032279 A1 Oct. 18, 2001

(30) Foreign Application Priority Data

Mar. 6, 2000 (JP) .............. 2000-065732

(51) Int. Cl.
*G06F 13/42* (2006.01)
*H04N 7/14* (2006.01)

(52) U.S. Cl. .............. 710/105; 710/36; 710/110

(58) Field of Classification Search .............. 710/36, 710/313, 305; 455/67.11; 370/348, 402; *H04L 29/06, H04L 29/00, 11/00, 12/28*
See application file for complete search history.

(56) References Cited

U.S. PATENT DOCUMENTS 5,710,979 A * 1/1998 Tamai ............... 455/67.11
5,754,548 A * 5/1998 Hoekstra et al. ............ 370/402
5,799,206 A * 8/1998 Kitagawa et al. ............. 710/36
6,160,637 A * 12/2000 Kagawa ................... 358/434
6,161,161 A * 12/2000 Botkin et al. .............. 710/313
6,614,778 B1 * 9/2003 Hwang ..................... 370/348
6,615,306 B1 * 9/2003 Ajanovic .................... 710/305

FOREIGN PATENT DOCUMENTS

| EP | 0 812 092 A2 | * | 12/1997 |
| EP | 0 938 218 A2 | | 8/1999 |
| EP | 0 967 757 A2 | * | 12/1999 |
| JP | 359172862 A | * | 9/1984 |
| JP | 406037841 A | * | 2/1994 |

OTHER PUBLICATIONS

"AV/C Digital Interface Command Set General Specification". 1394 Trade Association. XP-002111053. Version 3.0, Apr. 15, 1998.
"IEEE Standard for a High Performance Serial Bus", IEEE STD 1394-1995. XP-002256119. 1996.

* cited by examiner

*Primary Examiner*—Christopher E. Lee
(74) *Attorney, Agent, or Firm*—Oblon, Spivak, McClelland, Maier & Neustadt, P.C.

(57) ABSTRACT

An electronic device system of the invention has a controlling device and a controlled device interconnected via a data bus which complies with a predetermined communication format and which allows data to be exchanged between the devices. In a command transmission/reception transaction, the controlling device transmits a command to the controlled device. If an interim response is returned from the controlled device, the controlling device regards the transaction as complete and terminates the process without waiting for receipt of a final response from the controlled device.

9 Claims, 33 Drawing Sheets

IEEE1394 BUS CONNECTION

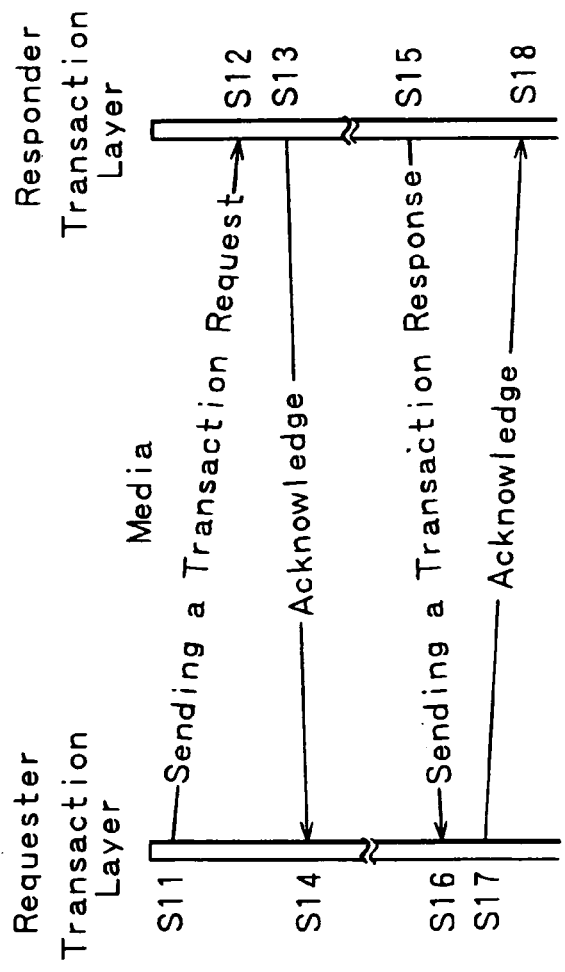

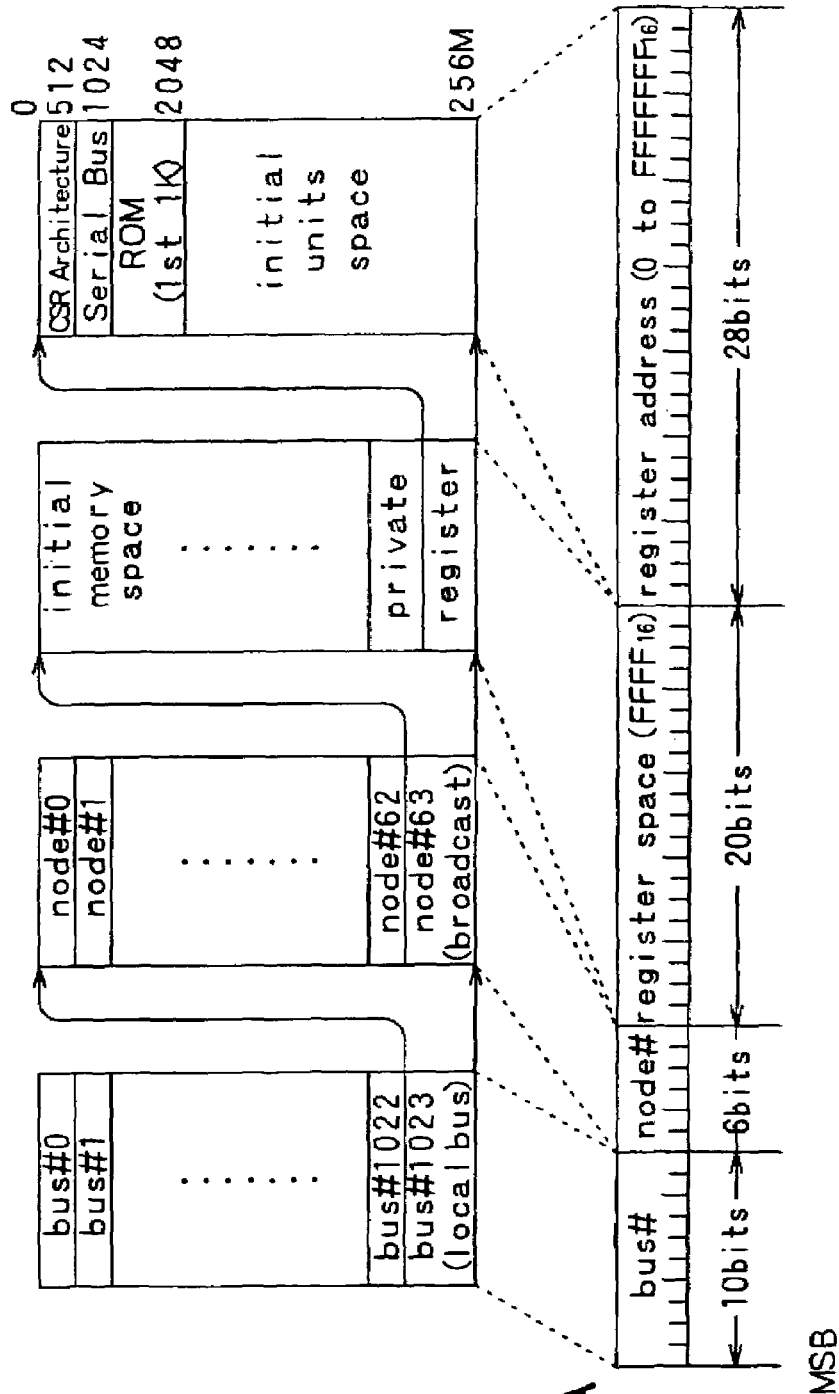

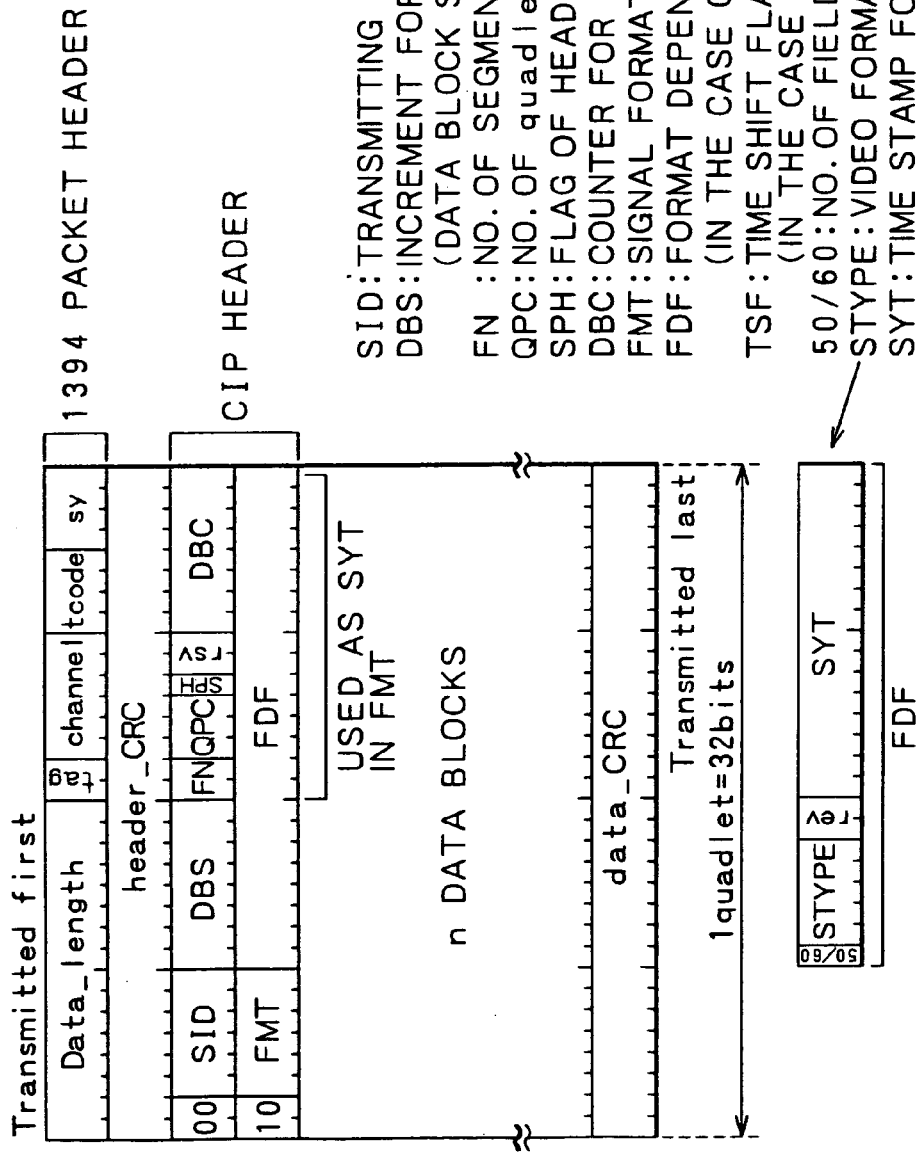

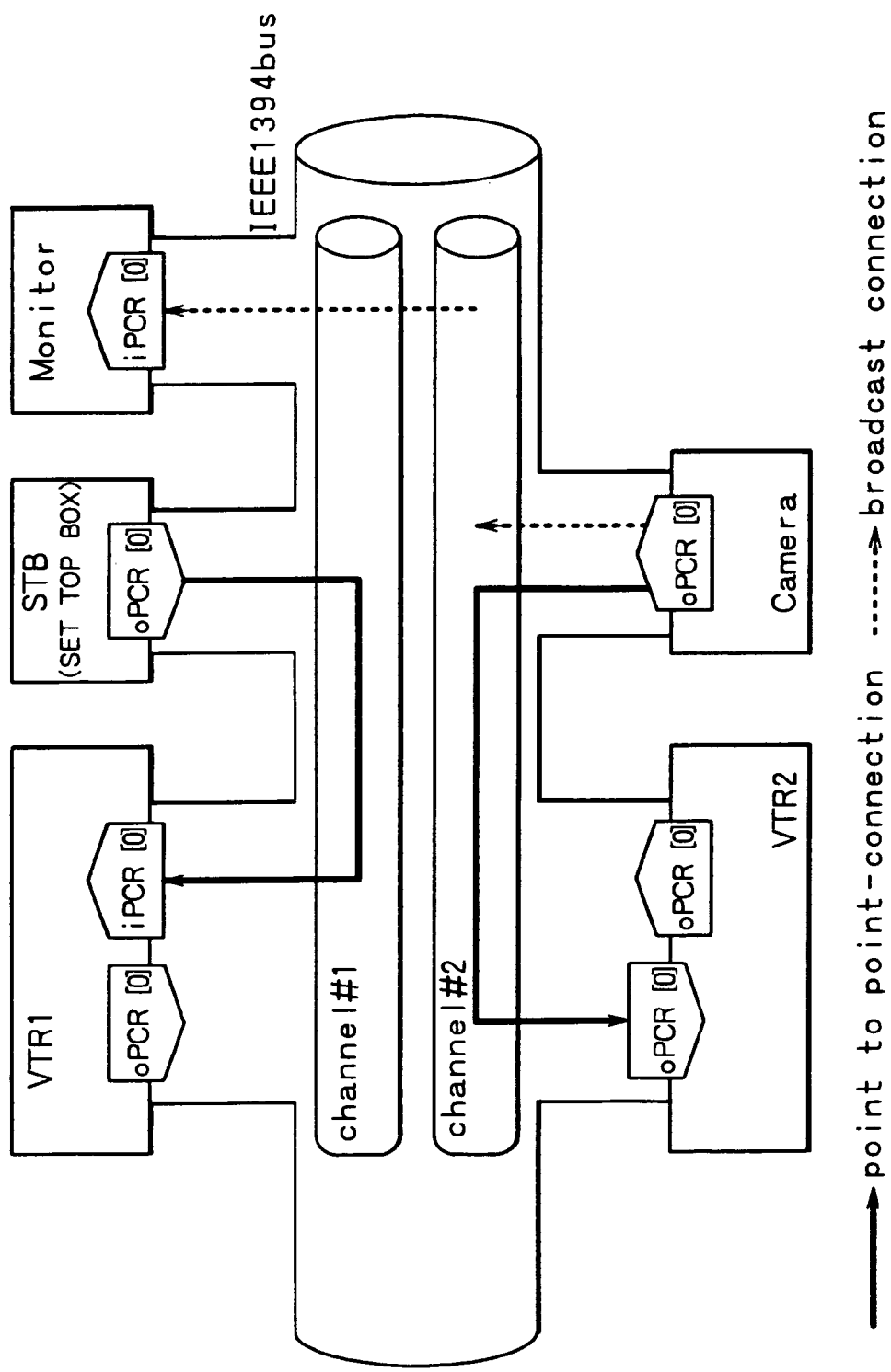

FIG.21 ctype/response

| | | |
|---|---|---|
| Command | 0000 | CONTROL |
| | 0001 | STATUS |
| | 0010 | INQUIRY |
| | 0011 | NOTIFY |
| | 0100 ⌇ 0111 | (reserved) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved) |
| | 1111 | INTERIM |

FIG. 22A

| subunit_type | |
|---|---|
| 00000 | Monitor |
| ~ | (reserved) |
| 00011 | Disc recorder/player |
| 00100 | VCR |
| 00101 | Tuner |
| 00111 | Camera |
| ~ | (reserved) |
| 11111 | Unit* |

FIG. 22B opcode:Operation Code

| | |
|---|---|
| 00h | VENDOR-DEPENDENT |
| 50h | SEACH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

*AN opcode TABLE IS PROVIDED FOR EACH subunit

*AN operand IS DEFINED FOR EACH opcode

Location of plug address spaces

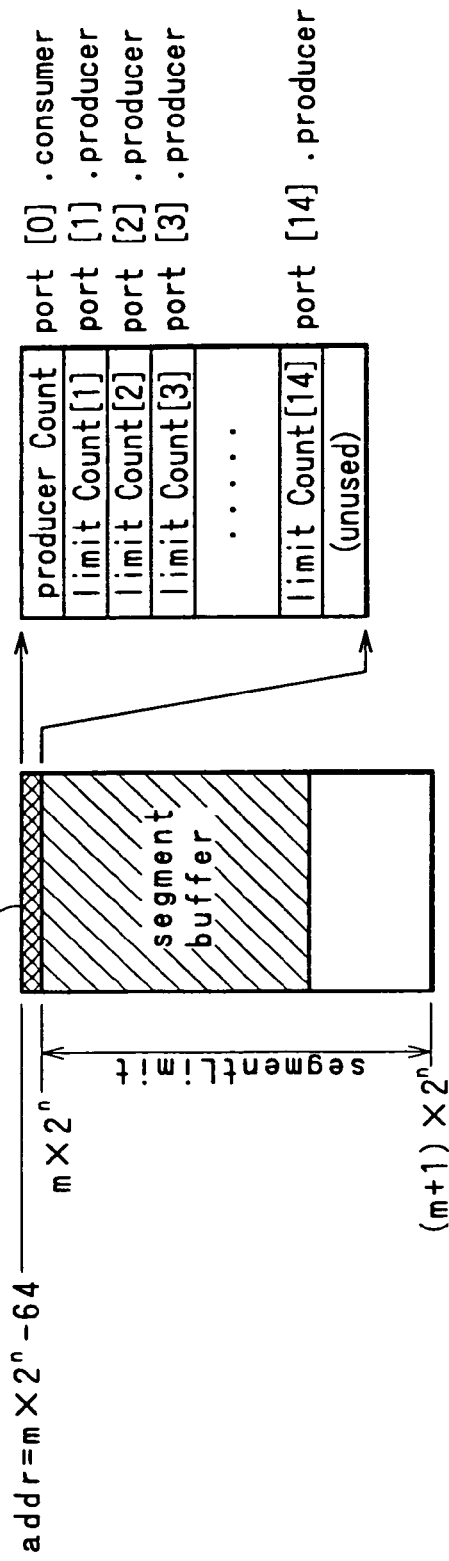

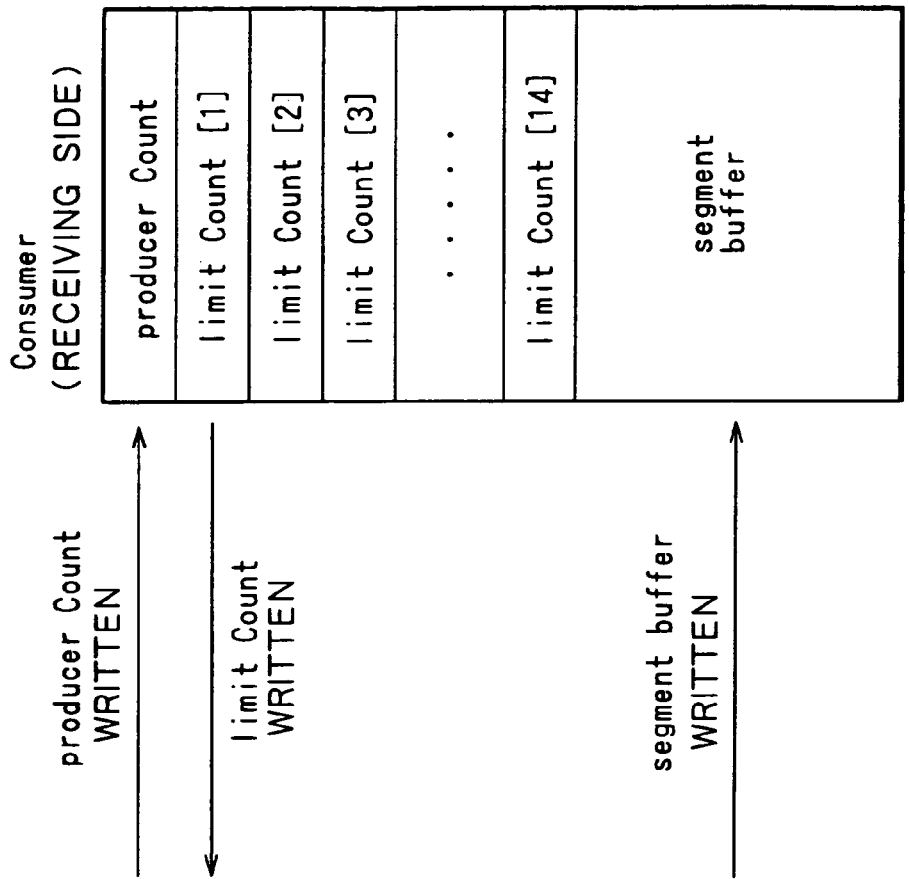
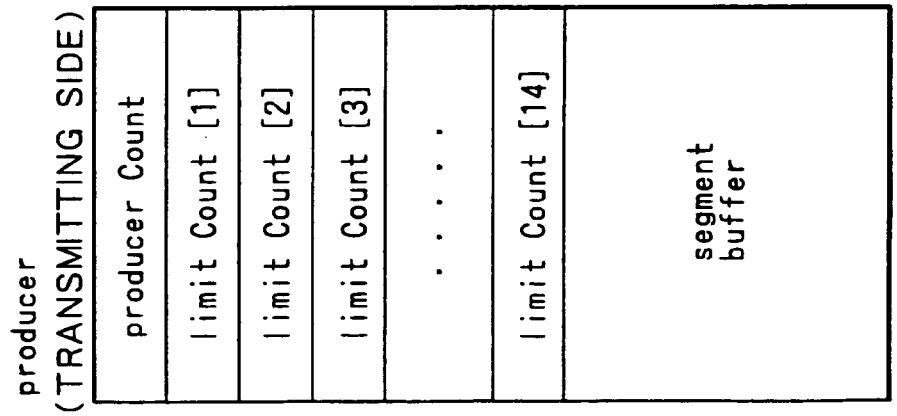

PROCEDURES FOR Asynchronous Connection TRANSMISSION AND RECEPTION

POWER CONTROL command

ELECTRONIC DEVICE SYSTEM, CONTROLLING DEVICE AND CONTROLLING METHOD

BACKGROUND OF THE INVENTION

The present invention relates to an electronic device system for allowing component electronic devices to exchange data therebetween through a data interface pursuant to a predetermined data communication format; to a controlling device constituting part of such an electronic device system; and to a controlling method for use with the electronic device system.

Today, the IEEE (Institute of Electrical and Electronic Engineers) 1394 data interface has gained widespread acceptance as a digital data interface. Faster than the SCSI (Small Computer System Interface) among others in terms of data transfer rates, the IEEE 1394 data interface is known to permit isochronous communication whereby data of a predetermined size are transmitted and received periodically. As such, the IEEE 1394 data interface is deemed advantageous in transferring stream data such as AV (audio/video) data in real time.

Against that background, those AV systems have been proposed which interconnect various digital AV devices and electronic equipment such as a personal computer via a data bus complying with data interface standards such as the IEEE 1394.

One such AV system is a so-called component system which centers on an amplifier device and includes a CD player, an MD recorder/player, and various AV source output devices such as video equipment, all interconnected via a data bus within the system.

The above type of AV system allows commands to be exchanged between a plurality of its component devices in accordance with IEEE 1394 data interface criteria so that one device may control another device in what is known as a remote control operation. This feature helps make the AV system more functional and convenient.

Illustratively, with an IEEE 1394 data interface in use, the completion of a single command transmission process is defined as ranging from transmission of a command from a device acting as a controller to a device serving as a target, to reception by the controller of a final response from the target regarding the transmitted command. The process is called a transaction. According to IEEE 1394 criteria, the controller is prevented from initiating any new process such as transmission of a new command until the series of steps constituting a single transaction comes to an end.

Suppose now that the target which received a command may be slow in returning a final response illustratively because of an incomplete process it has undertaken since before the receipt of the command. In that case, the controller is forced to wait for the unfinished transaction to be completed, which may take some time.

Suppose also that a plurality of component devices making up the system are run cooperatively under remote control so as to accomplish a certain action. In that setup, the controller may require each of the target devices working in cooperation to carry out an independent transaction. If it takes some time to complete a transaction with each target, then an inordinately long time may have to elapse before all targets complete their cooperative operations. As a result, the user may feel frustrated at seeing the system operate in a very sluggish fashion in its cooperative action.

SUMMARY OF THE INVENTION

The present invention has been made in view of the above circumstances and provides a system and a method offering a more comfortable system environment wherein each transaction is completed in the shortest possible time so that the system will operate at a significantly higher speed than before.

In carrying out the invention and according to one aspect thereof, there is provided an electronic device system having a controlling device and a controlled device interconnected via a data bus which complies with a predetermined communication format and which allows data to be exchanged between the devices, the electronic device system comprising: a transmitting element for causing the controlling device to transmit a command to the controlled device over the data bus in a transaction; a receiving element for allowing the controlling device to receive a command returned by the controlled device over the data bus in response to the transmitted command during the transaction; a judging element for judging whether the command received by the receiving element is an interim response; and a controlling element which, if the judging element judges the command received by the receiving element to be the interim response, then terminates the transaction without waiting for reception of a final response from the controlled device.

According to another aspect of the invention, there is provided a controlling device connected to a controlled device via a data bus which complies with a predetermined communication format and which allows data to be exchanged between the devices, the controlling device comprising: a transmitting element for transmitting a command to the controlled device over the data bus in a transaction; a receiving element for receiving a command returned by the controlled device over the data bus in response to the transmitted command during the transaction; a judging element for judging whether the command received by the receiving element is an interim response; and a controlling element which, if the judging element judges the command received by the receiving element to be the interim response, then terminates the transaction without waiting for reception of a final response from the controlled device.

Other objects, features and advantages of the invention will become more apparent upon a reading of the following description and appended drawings.

BRIEF DESCRIPTION OF THE DRAWINGS

FIG. 14A is a transition diagram showing basic transaction rules on asynchronous communication;

FIG. 14B is a table listing contents of transmitted transaction requests;

FIG. 15A is a schematic view of a data structure in a bus address register for an IEEE 1394 bus;

FIG. 15B is a schematic view of a data structure of bus IDs for identifying IEEE 1394 buses;

FIG. 15C is a schematic view of a data structure of node IDs assigned to devices connected to an IEEE 1394 bus arrangement;

FIG. 15D is a schematic view of a register space data structure for an IEEE 1394 bus;

FIG. 15E is a schematic view of a register address data structure for an IEEE 1394 bus;

FIG. 16 is a schematic view of a CIP structure;

FIG. 17 is a schematic view of typical connective relations determined by plugs;

FIG. 21 is a ctype/response table;

FIG. 22A is a table of a subunit type data structure;

FIG. 22B is a table of commands in an operation code used when the subunit type is a VCR;

FIG. 25A is a view of a data structure in a plug address;

FIG. 25B is a view of a data structure constituting a register in a plug address;

FIG. 25C is an address offset table;

FIG. 26A is a view of a data structure constituting a register in a plug address on the producer side;

FIG. 26B is a view of a data structure constituting a register in a plug address on the consumer side;

DETAILED DESCRIPTION OF THE PREFERRED EMBODIMENTS

Preferred embodiments of this invention will now be described in the following order:

1. AV System
   1-1. Overall Configuration
   1-2. STR (Front Panel)
   1-3. CD Device (Front Panel)
   1-4. MD Device (Front Panel)
   1-5. STR (Internal Structure)
   1-6. CD Device (Internal Structure)
   1-7. MD Device (Internal Structure)

Figure 1:
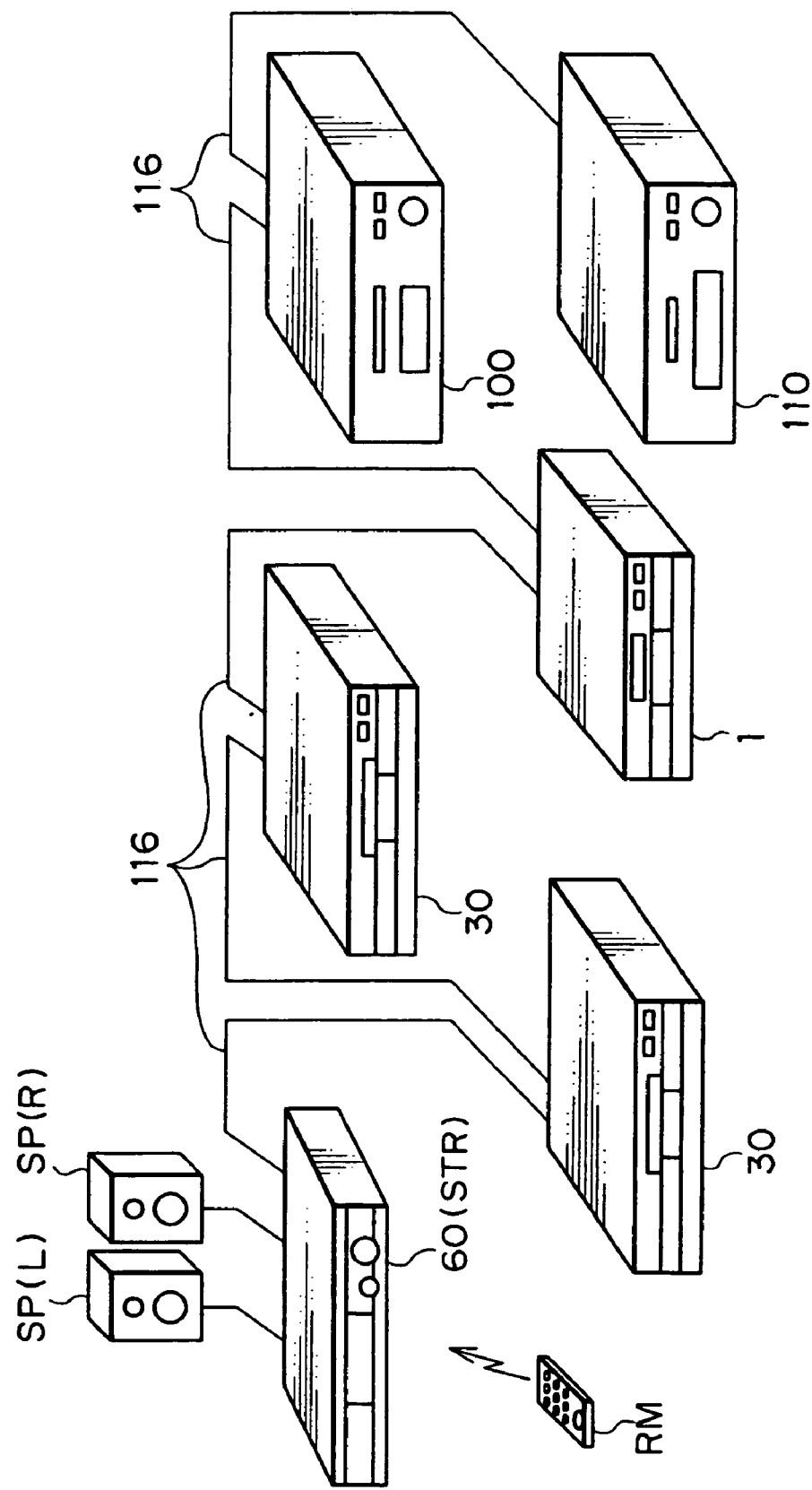
FIG. 1 is a schematic block diagram of an audio/visual system embodying the invention.

2. Data Communications of the Inventive System in Compliance with the IEEE 1394
   2-1. Overview
   2-2. Stack Model
   2-3. Forms of Signal Transmission
   2-4. Bus Connection between Devices
   2-5. Packets
   2-6. Transaction Rules
   2-7. Addressing
   2-8. CIP (Common Isochronous Packet)
   2-9. Connection Management
   2-10. Commands and Responses under FCP
   2-11. AV/C Command Packet
   2-12. Plugs
   2-13. Asynchronous Connection Transmission Procedures 3. Node Classification Process 4. Transaction Processing
   4-1. Basic Rules of Transactions
   4-2. Transaction Processing of the Embodiment 1. AV System 1-1. Overall Configuration FIG. 1 shows a typical configuration of an electronic device system embodying the present invention. This embodiment is constituted by having a plurality of AV devices interconnected via an IEEE 1394 interface data bus for data exchanges therebetween.

In FIG. 1, the embodiment as an AV system is composed of an STR (stereo tuner receiver) 60, two STR-compatible CD devices 30, one STR-compatible MD device 1, a device 100 from the same vender as that of the configured components, and a device 110 from a different vender.

The STR 60 plays a principal role in the functioning of the AV system in FIG. 1, providing a tuner function, an external source input selection function, and an amplifier function among others. Illustratively, the STR 60 is connected to a left-hand and a right-hand channel speaker SP(L), SP(R) corresponding to the stereo channels as indicated.

As will be described later in more detail, the STR 60 selects one of multiple inputs: a broadcast signal received by the internal tuner, an analog audio signal, and a plurality of audio sources entered externally over an IEEE 1394 bus 116. The selected input is output eventually from the speakers SP(L), SP(R) as an audio output.

FIG. 1 also indicates a remote controller RM for operating the STR 60. An operation command signal transmitted by the remote controller RM in response to a user's operation on it causes the STR 60 to perform what is instructed by the command signal. Although FIG. 1 shows only the remote controller RM for use with the STR 60, any other configured component may also be operated by a suitable remote controller.

The STR-compatible CD devices 30 and STR-compatible MD device 1 offer various system functions that prove to be highly convenient when the devices are connected to the STR 60. These devices may illustratively come from the same vender as that of the STR 60.

The STR-compatible CD devices 30 have a CD (Compact Disc) player function each, playing back a loaded CD. They are capable of transmitting audio data reproduced from the CD over the IEEE 1394 bus 116 for output.

The STR-compatible MD device 1 is an MD recorder and player capable of writing and reading audio data to and from a writable magneto-optical disc known as MD (Mini Disc: trademark). On receiving audio data sent over the IEEE 1394 bus 116, the MD device 1 writes the data to the MD; when reproducing audio data from the MD, the MD device 1 transmits the data over the IEEE 1394 bus 116 for output.

Typical system operations effected by the STR 60, STR-compatible CD device 30, and STR-compatible MD device 1 are as follows:

When audio data reproduced from a CD by the STR-compatible CD device 30 are sent to the STR-compatible MD device 1, the latter can record the audio data to an MD in what is known as a dubbing operation. If either the audio data reproduced from the CD by the STR-compatible CD device 30 or the data received by the STR-compatible MD device 1 are forwarded to the STR 60, the STR 60 can output the data as a monitor audio signal through the speakers SP(L), SP(R).

Although not described here in detail, the STR-compatible CD devices 30 and STR-compatible MD device 1 are arranged to provide diverse functions specific to a typical audio component system that is implemented with the STR 60 functionally at its center. Illustratively, when audio data are to be dubbed from the STR-compatible CD device 30 to the STR-compatible MD device 1, these devices readily operate in any one of multiple modes such as double-speed dubbing mode and synchronized dubbing mode. In synchronized dubbing mode, the start and end of data reproduction from the CD is synchronized with the start and end of data recording to the MD.

The device 100 is a digital AV device having a communication function compatible with the IEEE 1394 interface, and comes from the same vender as that of the STR 60, STR-compatible CD devices 30, and STR-compatible MD device 1. The device 100 may be any one of a CD player, an MD recorder/player, a digital VTR, and other equipment.

Unlike the STR-compatible CD device 30 and MD device 1, the device 100 is not provided with a system component function centering on the STR 60.

Still, the device 100 is capable of offering a specific function designated by the same vender as that of the STR 60, STR-compatible CD device 30 and STR-compatible MD device 1 through the use of vender-dependent commands that are exchanged within the system.

If the STR 60 is manually operated to receive selectively audio source data from the device 100, the received data may be monitored as an audio signal. Where the STR-compatible MD device 1 is manually operated to select audio data sent from the device 100, the data thus selected may be recorded to the MD. The same applies to the device 110 from a different vender, to be described below.

The device 110 is another digital AV device having a communication function compatible with the IEEE 1394 interface, and comes from a vender different from that of the STR 60, STR-compatible CD device 30 and STR-compatible MD device 1. The device 110 many also be any one of a CD player, an MD recorder/player, a digital VTR and other equipment. This device 110 in principle is not capable of responding to vender-dependent commands that may be designated by the vender of the STR 60.

Although not shown in FIG. 1, each of the configured AV devices either has a power plug for tapping power from a commercial AC source or is capable of accommodating batteries if the device in question is a battery-driven type. In any case, the configured devices are each powered independently of one another.

1-2. STR (Front Panel)

What follows is a description of keys, controls, etc., on a front panel of the STR 60 playing a principal role in the system of FIG. 1. Descriptions will also be given later about the front panels of the STR-compatible CD device 30 and MD device 1 constituting an audio component system in conjunction with the STR 60.

Figure 2:
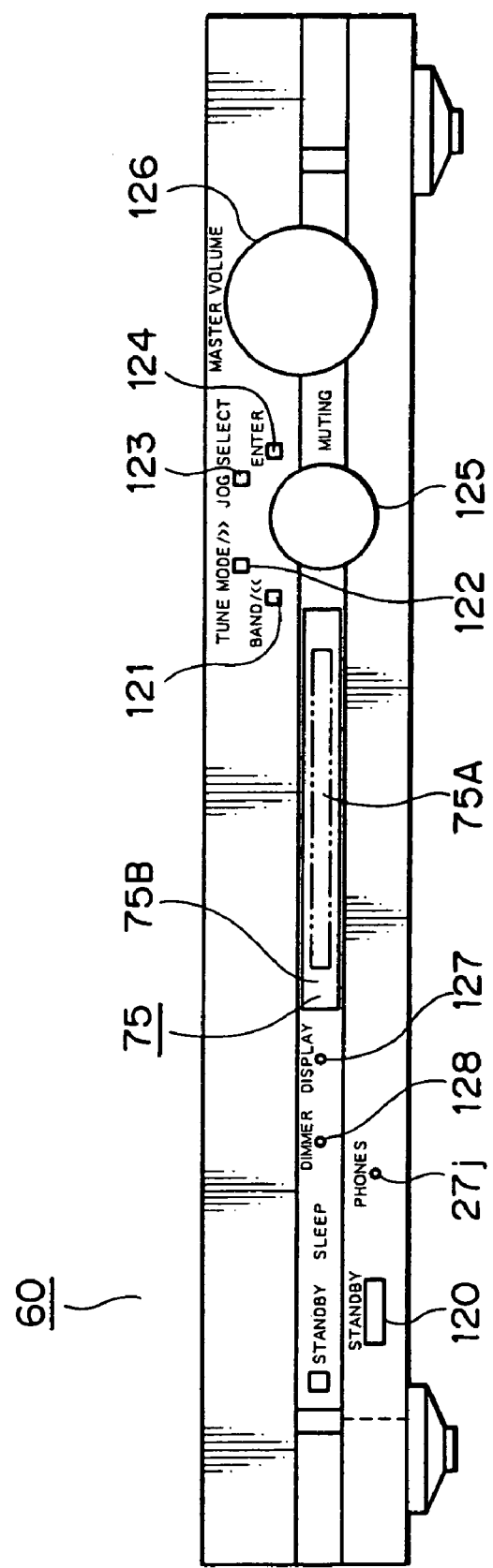
FIG. 2 is an external view of a tuner-equipped amplifier STR included in FIG. 1.

FIG. 2 shows the front panel of the STR 60. In the bottom left-hand corner of the front panel is a power key 120. Operating the power key 120 turns on and off power to the STR 60. A power-off state is equivalent to what is known as a standby state in which a standby power supply remains activated. That is, the power-off state differs from a state where a commercial AC power source (or battery) is switched off. The same applies to the STR-compatible CD device 30 and MD device 1, as will be described later.

Although not described here in detail, the STR 60 has a power-saving feature in the form of sleep mode that puts the system in a sleep state.

A headphone jack 27*j* is located to the right of the power key 120.

A display unit 75 is located approximately in the middle of the front panel. The display unit 75 comprises an FL tube indicator 75A mainly to display characters. This indicator 75A displays up to 14 characters on one line. The indicator 75A is surrounded by a segment indicator 75B which, although not shown, displays predetermined contents in segments.

To the left of the display unit 75 is a display key 127. A dimmer key 128 is located to the left of the display key 127.

The display key 127 is used to change contents displayed on the display unit 75. The dimmer key 128 is operated to adjust the brightness of the display unit 75 as well as decorative LEDs that may be attached to the front panel in practice.

To the right of the FL tube indicator 75A is a jog dial 125. Above the jog dial 125 are a band key 121, a tuner mode key 122, a jog selection key 123, and an enter key 124.

The band key 121 and tuner mode key 122 are used in connection with the tuner function of the STR 60. That is, the band key 121 and tuner mode key are used to switch received bands and tuner modes respectively.

The jog selection key 123 is operated to select menu items. The enter key 124 is used to make a finalizing operation.

The jog dial 125 is used in combination with other keys according to a suitable operating procedure. The jog dial 125 in conjunction with specific keys allows users to carry out diverse operations.

For example, every time the jog selection key 123 is pressed, the indication on the FL tube indicator 75A changes from "FUNCTION" to "SOUND" to "SETUP" alternately. With "FUNCTION" displayed on the FL tube indicator 75A, rotating the jog dial 125 permits alternate selection of an audio source that the STR 60 receives and outputs as a monitor audio output. At this point, the FL tube indicator 75A displays the name of the input source currently selected by rotary operation of the jog dial 125. The operation makes it possible to select in a predetermined sequence a tuner audio output, an analog input, and any one of different sources (i.e., devices) whose output may be input over the IEEE 1394 bus.

The band key 121, tuner mode key 122, jog selection key 123, and enter key 124 are each backed by a decorative LED that lights or blinks in keeping with the operation status currently in effect.

A volume jog dial 126 is a dial key that is operated to adjust the level of an audio signal output by the STR 60, e.g., the volume of a sound to be output by the speakers SP(L), SP(R).

1-3. CD Device (Front Panel)

Figure 3:
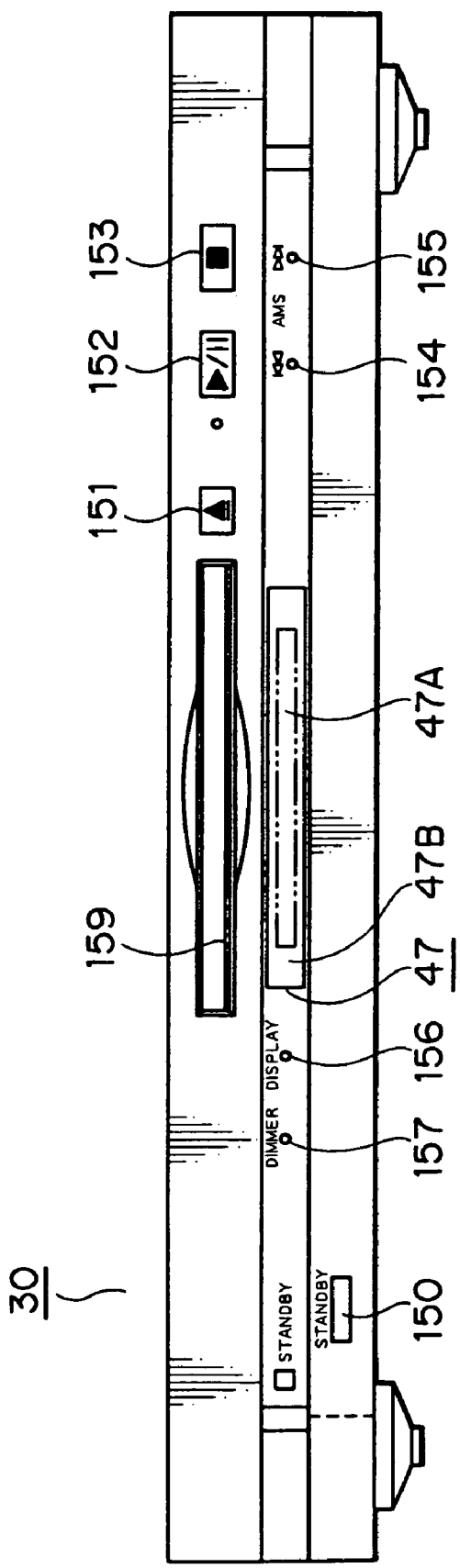
FIG. 3 is a front view depicting a front panel of a CD device included in FIG. 1.

FIG. 3 shows a typical front panel of the STR-compatible CD device 30. As with the STR 60, the CD device 30 also has a power key 150 located in the bottom left-hand corner of the front panel. The power key 150 is used to turn on and off power to the CD device 30, the power-off state being equivalent to a standby state.

A disc loading/unloading unit 159 is located in the top center portion of the front panel of the STR-compatible CD device 30. Illustratively, a loaded CD in the disc loading/unloading unit 159 is ejected by operating an eject key 151 located to the right of the unit 159.

Under the disc loading/unloading unit 159 on the front panel is a display unit 47 made up of an FL tube indicator 47A for displaying up to 14 characters on one line and of a segment indicator 47B. The FL tube indicator 47A displays such information in characters as a track number of a currently reproduced track on the loaded CD, playback status information including a playing time, and CD text data that may be inserted in a sub-code portion of the CD. The segment indicator 47B indicates a type of playback mode and other information.

Displayed contents on the FL tube indicator 47A are switched by operation of a display key 156 located to the left of the display unit 47. The brightness of the display is adjusted by operating a dimmer key 157.

On the right-hand side of the front panel are keys related to CD playback: a play/pause key 152, a stop key 153, and AMS-fast forward/rewind keys 154 and 155.

1-4. MD Device (Front Panel)

Figure 4:
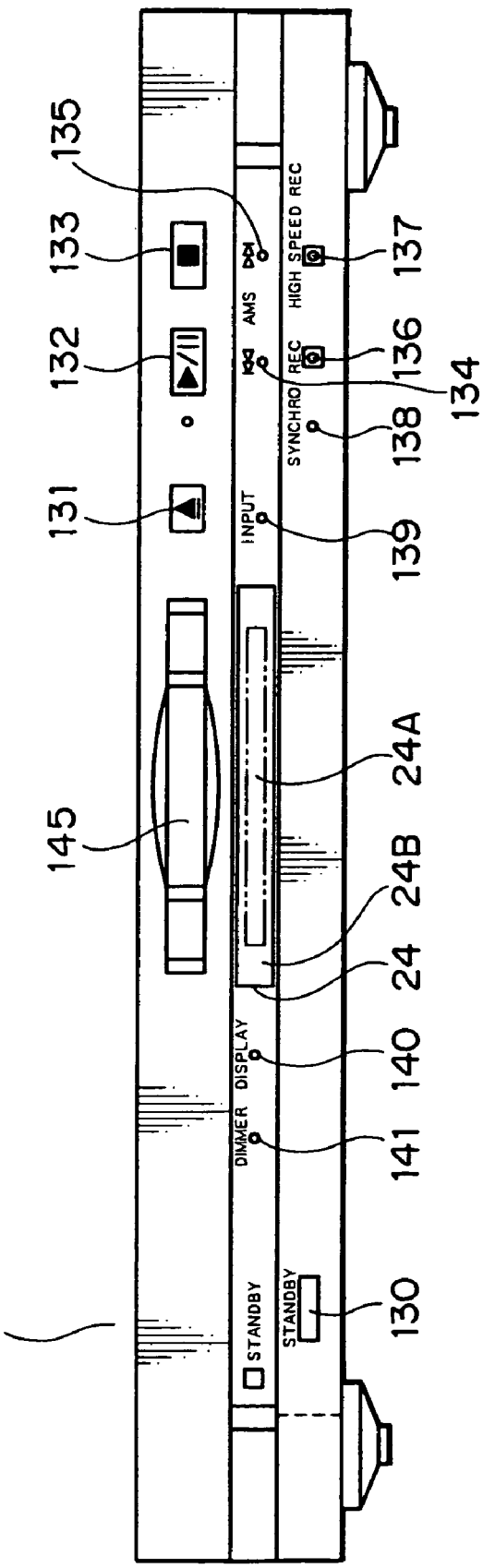
FIG. 4 is a front view illustrating a front panel of an MD device included in FIG. 1.

FIG. 4 shows the front panel of the STR-compatible MD device 1. As with the STR 60, the MD device 1 also has a power key 130 located in the bottom left-hand corner of the front panel.

A disc loading/unloading unit 145 is located in the top center portion of the front panel. An MD is loaded and unloaded into and out of the unit 145. In this case, a loaded MD in the unit 145 is ejected by also operating an eject key 131 located to the right of the unit 145.

Under the disc loading/unloading unit 145 on the front panel is also a display unit 24 made up of an FL tube indicator 24A for displaying up to 14 characters on one line and of a segment indicator 24B. The FL tube indicator 24A displays such information as a track number of a track currently recorded to or reproduced from the loaded MD, recording and reproduction status information including a recording or playing time, as well as a disc title and track names of the MD in question. As with the CD device, the segment indicator 24B also indicates a type of playback mode and other information.

Displayed contents on the FL tube indicator 24A of the STR-compatible MD device 1 are switched by operation of a display key 140. The brightness of the display is adjusted by operating a dimmer key 141.

On the right-hand side of the front panel are keys related to recording and reproduction: a play/pause key 132, a stop key 133, AMS-fast forward/rewind keys 134 and 135, a recording key 136, a high-speed dubbing key 137, and a synchronized recording key 138.

An input selection key 139 is provided to select the input of a recording source. Operating the input selection key 139 illustratively causes the FL tube indicator 24A to display the name of a currently selected recording source.

As shown in FIGS. 2 through 4, the front panels of the STR 60, STR-compatible CD device 30, and STR-compatible MD device 1 have their respective display units 75, 47 and 24. In other words, when these devices are regarded as component parts constituting a single audio system, the system has no unified display section. This reflects the fact that all devices interconnected via the IEEE 1394 interface are intrinsically independent entities.

1-5. STR (Internal Structure)

Internal structures of the STR 60, STR-compatible CD device 30, and STR-compatible MD device 1 will now be described.

Figure 5:
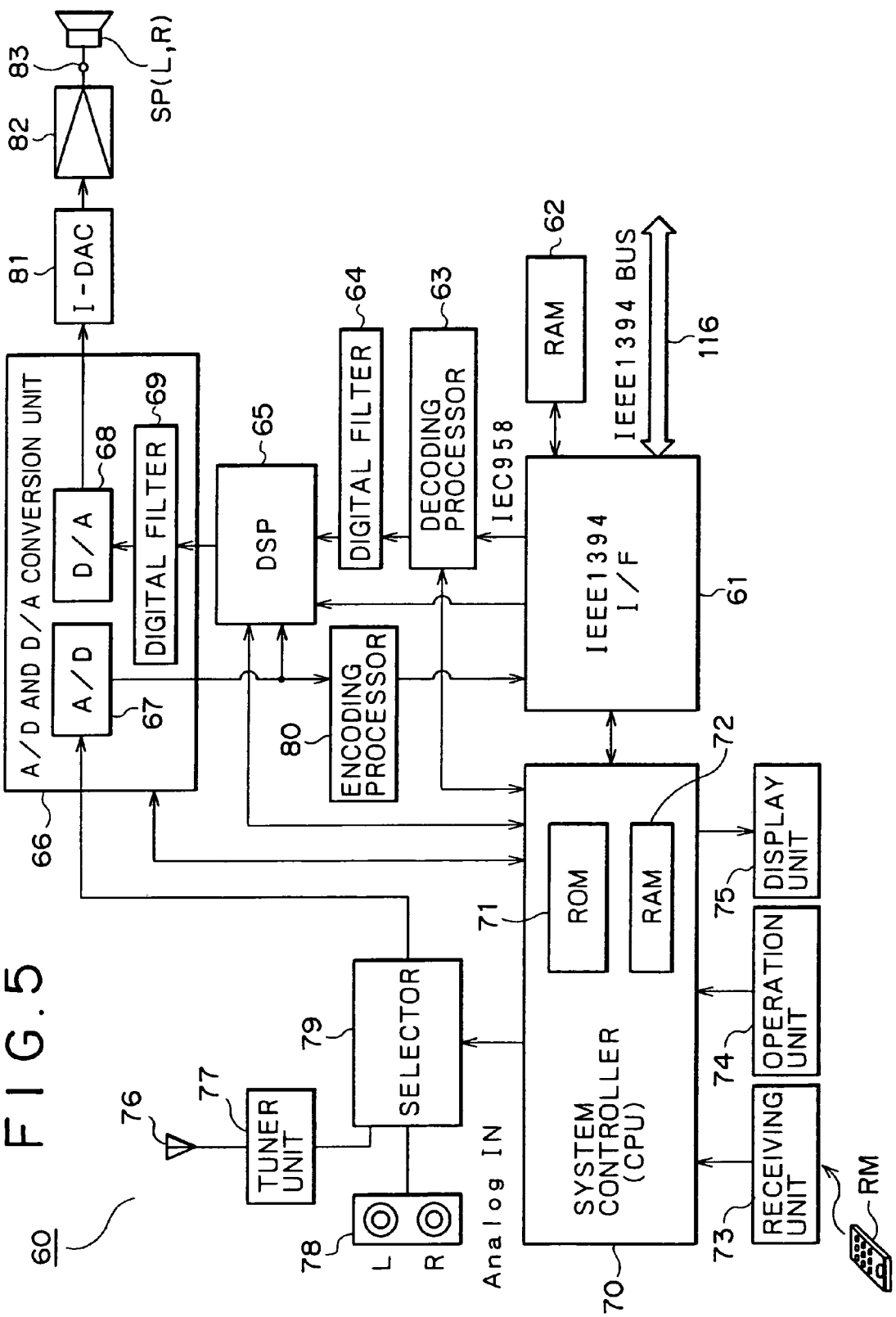
FIG. 5 is an internal block diagram of the tuner-equipped amplifier STR in FIG. 2.

FIG. 5 is a block diagram showing a typical internal structure of the STR 60. The STR 60 is capable of receiving three audio source inputs: an audio signal sent over the IEEE 1394 bus 116, an audio signal from its own internal tuner, and an external analog audio signal entered through an analog input terminal 78.

An IEEE 1394 interface 61 provides for data exchanges with external devices over the IEEE 1394 bus 116. The interface allows the STR 60 to exchange AV data and various commands with the outside.

In operation, the IEEE 1394 interface 61 decodes packets received over the IEEE 1394 bus 116 and extracts data from the decoded packets. The extracted data are converted to a format complying with internal data communication before being output.

Suppose that audio data are coming in from another AD device over the IEEE 1394 bus 116. In that case, the IEEE 1394 interface 61 receives the input audio data and decodes their packets. The decoded data are converted illustratively to a data format of a digital audio data interface called the IEC (International Electrotechnical Commission) 958 before being sent to a decoding processor 63.

The decoding processor 63 performs appropriate decoding processes on the input audio data illustratively in accordance with the IEC 958 format. The processed data are output to a digital filter 64.

The digital filter 64 is designed primarily to filter out jitters illustratively from input audio data. The data output from the decoding processor 63 have different sampling frequencies that are specific to data-originating devices. The digital filter 64 converts such different sampling frequencies of audio data to a sampling frequency of 44.1 kHz before output.

The audio data converted to a signal format having the sampling frequency of 44.1 kHz are input to a DSP (digital signal processor) 65.

If a data source is transmitting audio data already in the signal format having the sampling frequency of 44.1 kHz, the audio data may be forwarded from the IEEE 1394 interface 61 directly to the DSP 65, i.e., without the intervention of the decoding processor 63 and digital filter 64.

The DSP 65 performs various signal processes on the audio data including an equalizing process that may be set on an equalizer. The audio data having undergone such signal processes are output to a digital filter 69 of an A/D and D/A conversion unit 66.

The A/D and D/A conversion unit 66 is a circuit block for effecting analog-to-digital and digital-to-analog conversion of audio signals. The audio data input to the digital filter 69 of the conversion unit 66 are forwarded to a D/A converter 68 for conversion into a signal of a voltage pulse train. After the conversion, the signal is input to an I-DAC converter 81.

The I-DAC converter 81 converts the input voltage pulse train to a current. Although not shown in FIG. 5, a reference level is provided by a separate block. Manipulating that reference level allows an output current to be varied as desired. Illustratively, rheostat-based adjustments are available in a range of between −10 dB and −50 dB.

An amplifier 82 amplifies the output of the I-DAC converter 81, and sends an amplified output to speaker output terminals 83. Speakers SP(L), SP(R), when connected to the speaker output terminals 83, provide a stereo audio signal output.

A tuner unit 77 is incorporated in the STR 60. Broadcast radio waves captured by an antenna 76 are subjected to tuning and decoding processes by the tuner unit 77. The output of the tuner unit 77, such as an analog audio signal, is sent to a selector 79.

An analog audio signal input through an analog audio signal input terminal 78 is also input to the selector 79.

The selector 79, illustratively under control of a system controller 70, selects as an input source either the tuner unit 77 or the analog audio signal input terminal 78. The analog audio signal thus selected is fed to an A/D converter 67 in the A/D and D/A conversion unit 66. The A/D converter 67 converts the input analog audio data to digital audio data.

Where the digital audio data acquired by the A/D converter 67 are to be output as a monitor audio output, the data are routed as described above from the D/A converter 68 past the I-DAC converter 81 and the amplifier 82 up to the speakers SP(L), SP(R).

Where the digital audio data obtained by the A/D converter 67 are to be sent over the IEEE 1394 bus 116 to another AV device illustratively for recording purposes, the data are output to an encoding processor 80.

The encoding processor 80 subjects the received data to an encoding process complying with the format of a digital audio data interface such as the IEC 958. The processed data are output to the IEEE 1394 interface 61. By utilizing illustratively a RAM 62, the IEEE 1394 interface 61 performs various processes including packetization on the data for conversion to the format compatible with the IEEE 1394. The converted data are output over the IEEE 1394 bus 116 to a destination device.

The system controller 70 includes illustratively a CPU (central processing unit), a ROM 71 and a RAM 72. The controller 70 controls the STR 60 in its diverse operations.

Data from a receiving unit 73 and an operation unit 74 are input to the system controller 70. The receiving unit 73 illustratively receives a wireless command signal from the remote controller RM. The received command signal is forwarded to the system controller 70.

The operation unit 74 is made up illustratively of diverse keys and controls furnished on the front panel. Operations performed on the operation unit 74 cause the unit 74 correspondingly to produce operation data that are output to the system controller 70.

The system controller 70 performs diverse control processes to provide necessary operations in response to the command signal and operation data entered as described above.

The system controller 70 also causes the display unit 75 to give displays that are indicative of the received command signal, operation data, and current operation status. As mentioned above, the display unit 75 includes illustratively an FL tube indicator and a segment indicator.

1-6. CD Device (Internal Structure)

Figure 6:
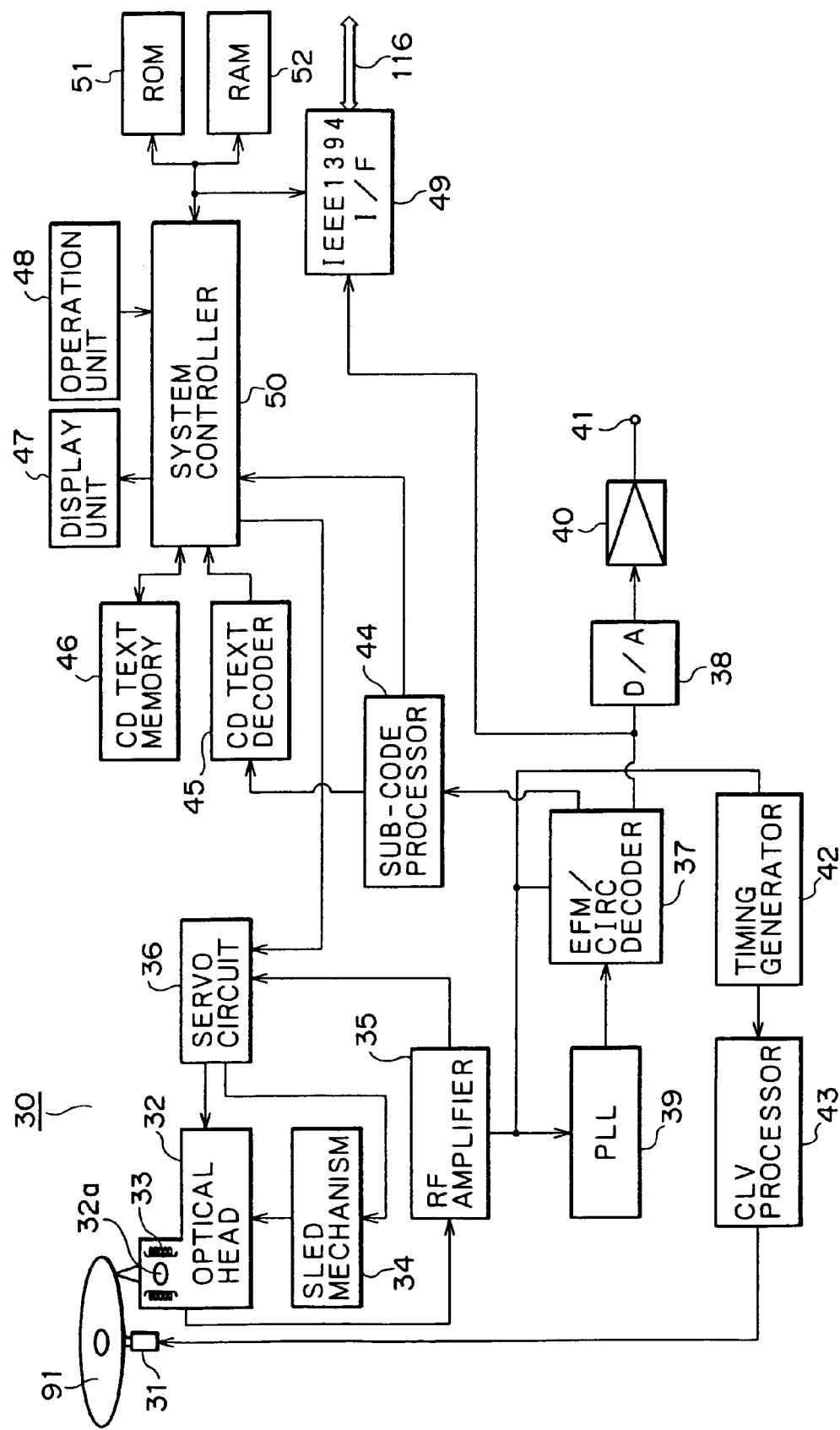
FIG. 6 is an internal block diagram of the CD device in FIG. 3.

A typical internal structure of the STR-compatible CD device 30 will now be described with reference to a block diagram in FIG. 6.

A read-only disc medium CD 91 is loaded into the disc loading/unloading unit 159 of the front panel. The CD 91 thus loaded is set in a playback position.

For a CD playback operation, the CD 91 loaded into its playback position is driven rotatively by a spindle motor 31 at a constant linear velocity (CLV). An optical head 32 reads data recorded in pits on the CD 91 and sends the retrieved data to an RF amplifier 35. In the optical head 32, an object lens 32a is supported by a two-axis mechanism 33 and can be displaced in the tracking and focusing directions. The optical head 32 is moved radially over the CD 91 by a sled mechanism 34.

The RF amplifier 35 generates a reproduced RF signal, as well as a focus error signal and tracking error signal. The error signals are sent to a servo circuit 36.

Given the focus error signal and tracking error signal, the servo circuit 36 generates various drive signals including a focus drive signal, a tracking drive signal, and a sled drive signal for control over the two-axis mechanism 33 and sled mechanism 34 in operation. That is, focus servo control and tracking servo control are carried out.

The reproduced RF signal generated in binary format by the RF amplifier 35 is also sent to a timing generator 42. The timing generator 42 generates a timing signal based on a waveform timing of the reproduced RF signal and feeds the generated timing signal to a CLV processor 43. Given the input timing signal, the CLV processor 43 generates a drive signal and feeds it to the spindle motor 31 so that the latter will be rotated at a required CLV level. This provides a spindle servo control setup wherein the CD 91 is driven rotatively at CLV.

The reproduced RF signal is fed to an EFM/CIRC decoder 37. The EFM/CIRC decoder 37 first brings the input reproduced RF signal into binary format to generate an EFM (eight fourteen modulation) signal. The decoder 37 then subjects the EFM signal illustratively to EFM demodulation and CIRC (Cross Interleave Reed Solomon Coding) decoding to decode the data retrieved from the CD 91 into audio data quantized in 16 bits and sampled at a frequency of 44.1 kHz.

Furthermore, the decoder 37 is structured to extract control data such as sub-code. The sub-code data portion is supplied to a sub-code processor 44 whereby necessary data are extracted. In particular, TOC (table of contents) data recorded as sub-Q data in a lead-in area of the CD are retrieved. The sub-code data and TOC data are sent to a system controller 50 for various control purposes. The system controller 50 carries out diverse control processes in order to effect various operations specific to this CD device.

The reproduced RF signal generated in binary format by the RF amplifier 35 is also fed to a PLL (phase lock loop) circuit 39. Given the RF signal, the PLL circuit 39 outputs a clock signal synchronized with channel bits of the input EFM signal. At standard speed, the clock frequency is 4.3218 MHz. The clock signal is utilized illustratively by signal processing circuits downstream of the EFM/CIRC decoder 37.

The audio data from the EFM/CIRC decoder 37 are branched to a D/A converter 38 and an IEEE 1394 interface 49.

The audio data input to the D/A converter 38 are converted to an analog audio signal. The signal after the conversion are output through an amplifier 40 to an external analog audio output terminal 41.

The audio data input to the IEEE 1394 interface 49 from the decoder 37 are converted to data complying with the IEEE 1394 format. The data after the conversion are transmitted to an external device over the IEEE 1394 bus 116.

The IEEE 1394 interface 49 also receives data such as externally supplied commands. The system controller 50 illustratively performs relevant processes corresponding to the received command.

To reproduce data from the CD 91 requires retrieving management information (i.e., TOC) from the disc. With the management information retrieved, the system controller 50 finds out the number of tracks on the CD 91 and addresses of the tracks for control over playback operation. When the CD 91 is loaded, the system controller 50 causes TOC information to be retrieved from the radially innermost region of the disc (lead-in area). The TOC thus read is stored illustratively in a work RAM 52 so that the information may be referenced during a subsequent playback operation on the CD 91.

The system controller 50 is a microcomputer that includes a CPU, an internal interface and other components and controls various operations outlined above.

A program ROM 51 accommodates programs for allowing the STR-compatible CD device 30 to carry out various operations. A work RAM 29 holds data and programs needed by a system controller 11 to perform diverse processes.

As is well known, it is possible to insert text data into the sub-code of a CD in keeping with the CD-related standards. Illustratively, a disc title and track names may thus be accommodated on the CD.

The STR-compatible CD device 30 of this embodiment provides for this feature and is capable of handling text data of the CD. That is, the CD device 30 may display on the display unit 47 characters based on the text data in the CD sub-code. The feature is implemented by the STR-compatible CD device 30 utilizing a CD text decoder 45 and a CD text memory 46.

Sub-code data acquired by the sub-code processor 44 are also input illustratively to the CD text decoder 45. If the input sub-code data are found to have CD text data inserted therein, the CD text decoder 45 decodes the data to obtain text data. The text data thus acquired are stored into the CD text memory 46 under control of the system controller 50.

Thereafter, the system controller 50 reads text data from the CD text memory 46 as needed and causes the FL tube indicator of the display unit 47 to display the retrieved data in characters.

An operation unit 48 is made up illustratively of the keys and controls furnished on the front panel. Although not shown in FIG. 6, the operation unit 48 may be equipped with a remote control function that utilizes illustratively an infrared remote commander.

The display unit 47 performs necessary display operations when the CD 91 is played back. Illustratively, the display unit 47 displays time information such as a total playing time and an elapsed playback/recording time; name information such as track numbers, a disc name and track names; operation status; and an operation mode, under control of the system controller 50. The display unit 47 also comprises the FL tube indicator and segment indicator as mentioned above.

1-7. MD Device (Internal Structure)

Figure 7:
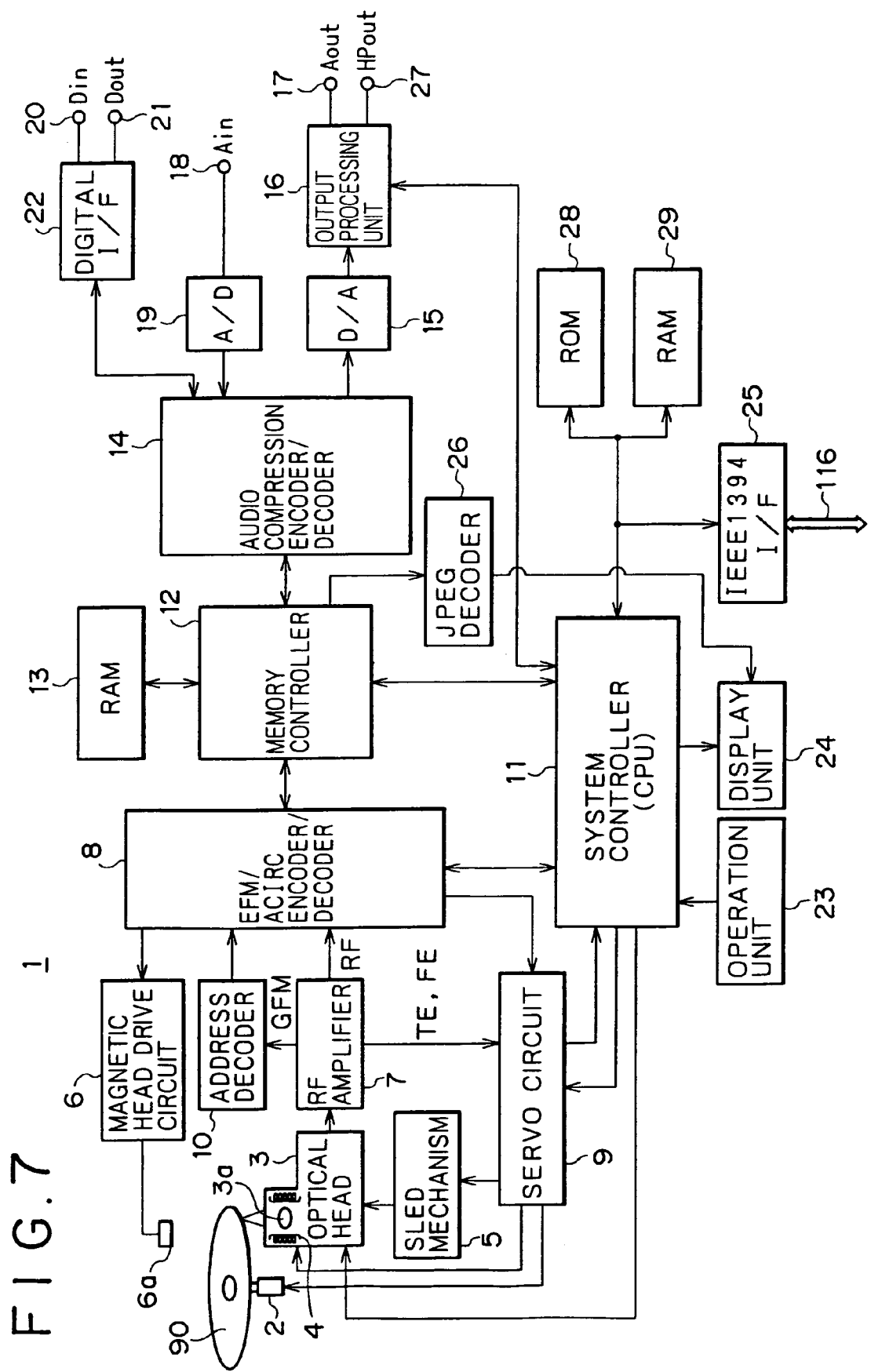
FIG. 7 is an internal block diagram of the MD device in FIG. 4.

FIG. 7 is a block diagram showing a typical internal structure of the STR-compatible MD device 1 that serves as an MD recorder/player.

A magneto-optical disc (Mini Disc) 90 to and from which audio data are written and read is driven rotatively by a spindle motor 2. For a recording or reproducing operation on the disc 90, an optical head 3 emits a laser beam onto the disc surface.

For the recording operation, the optical head 3 outputs high-level laser to heat a recording track up to the Curie temperature; for the reproducing operation, the optical head 3 outputs laser of a relatively low level to detect data from reflected light through the magnetic Kerr effect.

The optical head 3 implements its functions through the use of a laser diode serving as laser outputting means, an optics block including a polarization beam splitter and an object lens, and detectors for detecting reflected light. The object lens 3a is held by a two-axis mechanism 4 in a manner radially relocating over the disc surface and moving thereto and therefrom.

A magnetic head 6a is positioned in symmetric relation to the optical head 3 across the disc 90. In operation, the magnetic head 6a applies a magnetic field modulated by supplied data to the magneto-optical disc 90.

The optical head 3 as a whole and the magnetic head 6a are moved radially over the disc by a sled mechanism 5.

Upon playback, information retrieved from the disc 90 by the optical head 3 is supplied to an RF amplifier 7. In turn, the RF amplifier 7 processes the supplied information and extracts therefrom a reproduced RF signal, a tracking error signal TE, a focus error signal FE, and groove information GFM, i.e., absolute position information recorded in pre-grooves on the magneto-optical disc 90.

The reproduced RF signal thus extracted is sent to an EFM/ACIRC encoder/decoder 8. The tracking error signal TE and focus error signal FE are fed to a servo circuit 9. The groove information GFM is forwarded to an address decoder 10.

The servo circuit 9 generates various servo drive signals upon receipt of the tracking error signal TE and focus error signal FE and in accordance with a track jump command and an access command from the system controller 11 (microcomputer) as well as with detected rotating speed information from the spindle motor 2. The servo drive signals thus generated are used to control the two-axis mechanism 4 and sled mechanism 5 for focusing and tracking control and to keep the spindle motor 2 at a constant linear velocity.

The address decoder 10 decodes the supplied groove information GFM to extract address information therefrom. The address information is sent to the system controller 11 for control over various operations.

The reproduced RF signal is subjected to such decoding processes as EFM demodulation and ACIRC (Advanced Cross Interleave Reed Solomon Coding) by the EFM/ACIRC encoder/decoder 8. During the processing, address and sub-code data are extracted and fed to the system controller 11.

Audio data having undergone such decoding processes as EFM demodulation and ACIRC by the EFM/ACIRC encoder/decoder 8 are written temporarily to a buffer memory 13 under control of a memory controller 12. Retrieval of data from the disc 90 by the optical head 3 and transfer of reproduced data from the optical head 3 to the buffer memory 13 are carried out at a rate of 1.41 Mbits/sec, usually in an intermittent fashion.

The data written to the buffer memory 13 are retrieved in a properly timed manner for transfer at a rate of 0.3 Mbit/sec to an audio compression encoder/decoder 14. The encoder/decoder 14 subjects the received data in compressed format to decoding and other related reproduced-signal processes to generate a digital audio signal sampled at a frequency of 44.1 KHz and quantized in 16 bits.

The digital audio signal is converted to an analog signal by a D/A converter 15. The analog signal is sent to an output processing unit 16 for level and impedance adjustment before being output as an analog audio signal Aout through a line output terminal 17 to an external device. The analog audio signal is also fed to a headphone output terminal 27 as a headphone output HPout to headphones that may be connected.

The digital audio signal following decoding by the audio compression encoder/decoder 14 is sent to a digital interface 22 for output as a digital audio signal Dout through a digital output terminal 21 to an external device. Illustratively, the signal may be output to an external device over an optical cable.

An analog audio signal Ain fed to a line input terminal 18 for writing to the magneto-optical disc 90 is first converted to digital audio data by an A/D converter 19. The digital audio data are supplied to the audio compression encoder/decoder 14 for audio data compression encoding.

If a digital audio data Din is supplied through a digital input terminal 20 from an external device, the digital interface 22 extracts control codes from the supplied data. The audio data are forwarded to the audio compression encoder/decoder 14 for audio data compression encoding.

Although not shown, a microphone input terminal may obviously be provided to accept microphone input as an input signal as well.

The data compressed by the encoder/decoder 14 into recording data are written in a temporarily cumulative manner to the buffer memory 13 by the memory controller 12. The data are then retrieved from the buffer memory 13 in increments of a predetermined data size and sent to the EFM/ACIRC encoder/decoder 8 for encoding processes such as ACIRC encoding and EFM. After the encoding operation by the EFM/ACIRC encoder/decoder 8, the data are fed to a magnetic head drive circuit 6.

The magnetic head drive circuit 6 supplies the magnetic head 6a with a magnetic head drive signal in accordance with the encoded recording data. Specifically, the magnetic head drive circuit 6 causes the magnetic head 6a to apply an N or S field to the magneto-optical disc 90. At this time, the system controller 11 provides the optical head 3 with a control signal to output a recording-level laser beam.

An operation unit 23 is made up illustratively of the keys and controls furnished on the front panel. Operating information coming from the operation unit 23 as it is operated is sent to the system controller 11 which carries out control operations accordingly.

As is well known, the recording and reproducing apparatus for handling MDs is capable of such program editing operations as track (program) segmentation, track concatenation, track erasure, track name input, and disc name input. Since these operations are relatively complicated, it is preferable to make suitable arrangements so that operation command signals from a remote controller, not shown, may be received for editing purposes. With such arrangements in place, various program editing operations may be carried out by simply operating keys on the remote controller.

The display unit 24 is controlled in its display operation by the system controller 11. The system controller 11 transmits data to be displayed to a display driver inside the display unit 24 for data display. Given the data, the display driver drives accordingly the display unit 24 such as a liquid crystal display in display operation so that numerals, characters and symbols are displayed.

The display unit 24 indicates operation mode status of the disc currently loaded for recording or playback, as well as the track number, recording or playback time, and editing status.

The disc 90 is capable of storing character information such as track names to be managed in connection with programs furnished as main data. Characters upon input as character information are displayed on the display unit 24, and character information retrieved from the disc is also displayed.

With this embodiment, the disc 90 may record auxiliary data as a data file independent of music and other data constituting programs.

A data file as auxiliary data is made of information such as characters and still pictures. These characters and still pictures may be output and displayed by the display unit 24.

This embodiment of the invention has a JPEG decoder 26 designed to display still pictures and characters made of auxiliary data onto the display unit 24.

More specifically, still picture data making up a data file as auxiliary data are recorded in a compressed file format complying with the JPEG (Joint Photographic Coding Experts Group) criteria. The JPEG decoder 26 admits through the memory controller 12 illustratively a still picture data file that was retrieved from the disc 90 and written cumulatively to the buffer memory 13. The received file is decompressed as per the JPEG criteria before being output to the display unit 24. This causes the display unit 24 to display the still picture data made up of auxiliary data.

The display unit 24 also comprises the FL tube indicator and segment indicator as mentioned above.

The system controller 11 is a microcomputer comprising a CPU and an internal interface. The microcomputer performs the above-described diverse control operations.

The program ROM 28 stores programs for allowing this recording and reproducing apparatus to implement various operations. The work RAM 29 accommodates as needed data and programs for allowing the system controller 11 to carry out various processes.

To write or reproduce data to or from the disc 90 requires retrieving therefrom management information, i.e., P-TOC (pre-mastered TOC (table of contents)) and U-TOC (user TOC). Given such management information, the system controller 11 identifies addresses of those areas on the disc 90 to or from which to record or retrieve data. The management information is retained in the buffer memory 13.

When the disc 90 is loaded, the system controller 11 retrieves its management information by reproducing data from the radially innermost region on the disc where the information in question is recorded. The retrieved information is placed into the buffer memory 13 which may be referenced subsequently to execute recording, playback or editing of programs on the disc 90.

The U-TOC is updated in keeping with program data recordings and various editing processes. Every time data are recorded or edited, the system controller 11 updates the U-TOC information in the buffer memory 13. The update operation is paralleled in a suitably timed manner by an update of the U-TOC area on the disc 90.

The disc 90 accommodates auxiliary data files apart from the programs. An AUX-TOC is formed on the disc 90 for managing these auxiliary data files.

Upon retrieval of the U-TOC, the system controller 11 also reads out the AUX-TOC and places it into the buffer memory 13. Managed status of the auxiliary data may later be referenced by looking up the AUX-TOC in the buffer memory 13.

The system controller 11 reads auxiliary data files as needed and in a suitably timed fashion or simultaneously with retrieval of the AUX-TOC. The retrieved files are placed into the buffer memory 13. The auxiliary data files are then output in a properly timed manner according to the AUX-TOC and displayed in the form of characters and images on the display unit 24 or on an external device via an IEEE 1394 interface 25.

The IEEE 1394 interface 25 is capable of transmitting and receiving audio data. That means the MD recorder/player of this embodiment may receive audio data transferred through the IEEE 1394 bus 116 and the IEEE 1394 interface 25 and may record the received data to the disc 90.

If the transmitted audio data are illustratively those sampled at a frequency of 44.1 KHz and quantized in 16 bits, then the data are forwarded through the system controller 11 to the audio compression encoder/decoder 14 for data compression.

If the transmitted audio data turn out to be compressed audio data in compliance with the compression format of this MD recorder/player, then the data are sent through the system controller 11 to the memory controller 12. Obviously, commands may also be transmitted and received through the IEEE 1394 interface 25. In such a case, the system controller 11 illustratively carries out necessary processes in response to the received command.

2. Data Communications of the Inventive System in Compliance with the IEEE 1394

2-1. Overview

Below is a description of how data communications of the embodiment take place in accordance with the IEEE 1394.

The IEEE 1394 constitutes one of serial data communication standards. Under the IEEE 1394, there are two data transmission method: isochronous communication method for periodical communications, and asynchronous communication method for asynchronous communications free of periodicity. Generally, the isochronous communication method is used for data transmission and reception while the asynchronous communication method is adopted for exchanging various control commands. A single cable allows data and commands to be transmitted and received by the two communication methods.

What follows is a description of the embodiment carrying out communications in compliance with the above-described IEEE 1394 criteria.

2-2. Stack Model

Figure 8:
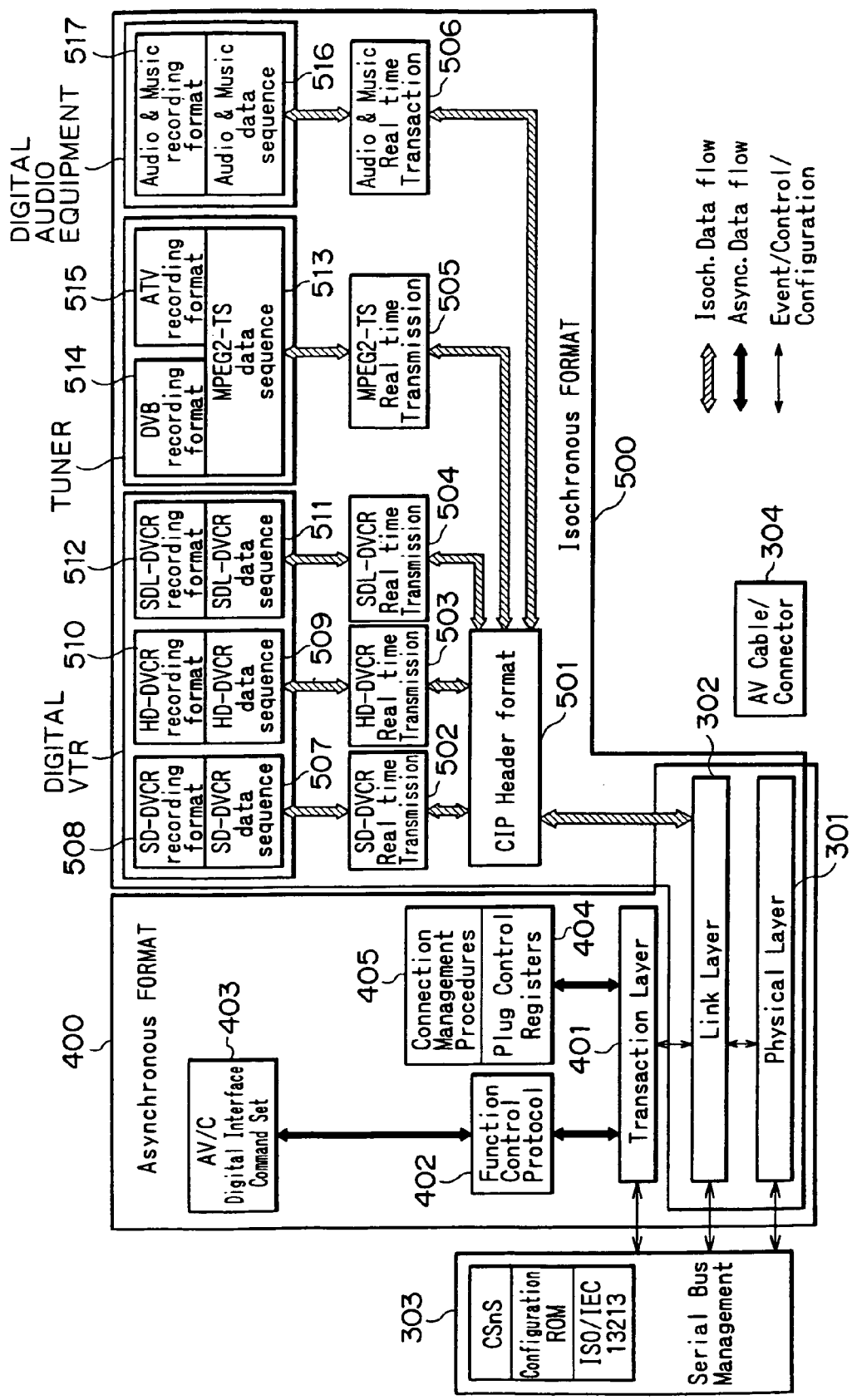
FIG. 8 is a structural view of a layer stack model in an IEEE 1394 format.

FIG. 8 shows a stack model of the IEEE 1394 as implemented in this embodiment. The IEEE 1394 format comes in two types: asynchronous format (400) and isochronous format (500). Common to both the asynchronous format (400) and the isochronous format (500) is the lowest layer called a physical layer (301) above which is a link layer (302). The physical layer (301) takes care of signal transmission on a hardware basis. The link layer (302) has functions for converting an IEEE 1394 bus illustratively to an internal bus specific to a given device.

The physical layer (301), the link layer (302), and a transaction layer (401) to be described below, are linked to serial bus management 303 by event/control/configuration lines. An AV cable/connector 304 represents physical connectors and cables needed for AV data transmission.

For the asynchronous format (400), the transaction layer (401) comes on top of the link layer (302). The transaction layer (401) defines data transmission protocols of the IEEE 1394. As basic asynchronous transactions, the transaction layer (401) designates a write transaction, a read transaction and a lock transaction as will be described later.

The transaction layer (401) is topped by an FCP (Function Control Protocol) (402). The FCP (402) executes command control over various AV devices by use of control commands defined as AV/C commands (AV/C Digital Interface Command Set) (403).

Above the transaction layer (401) are plug control registers (404) for establishing plugs (logical device connections under the IEEE 1394, to be described later) using connection management procedures (405).

In the isochronous format (500), a CIP (Common Isochronous Packet) header format (501) comes above the link layer (302). Under management of the CIP header format (501), there are stipulated such transmission protocols as SD (standard density)-DVCR (Digital Video Camera Recorder) Real time Transmission (502), HD (High Density)-DVCR Real time Transmission (503), SDL (Standard Density Long)-DVCR Real time Transmission (504), MPEG2 (Moving Picture Coding Experts Group 2)-TS (Transport Stream) Real time Transmission (505), and Audio and Music Real time Transmission (506).

The SD-DVCR Real time Transmission (502), HD-DVCR Real time Transmission (503), and SDL-DVCR Real time Transmission (504) are data transmission protocols that address digital VTRs (Video Tape Recorders).

Data to be handled by the SD-DVCR Real time Transmission (502) are a data sequence (SD-DVCR data sequence (507)) acquired in accordance with an SD-DVCR recording format (508).

Data to be manipulated by the HD-DVCR Real time Transmission (503) are a data sequence (SD-DVCR data sequence (509)) obtained in keeping with an HD-DVCR recording format (510).

Data to be dealt with by the SDL-DVCR Real time Transmission (504) are a data sequence (SD-DVCR data sequence (511)) gained as per an SDL-DVCR recording format (512).

The MPEG2-TS Real time Transmission (505) is a transmission protocol that addresses illustratively tuners for digital broadcasts via satellite. Data to be handled by this protocol are a data sequence (MPEG2-TS data sequence (513)) acquired in compliance with a DVB (Digital Video Broadcast) recording format (514) or an ATV (Analog Television) recording format (515).

The Audio and Music Real time Transmission (506) is a transmission protocol that addresses a whole range of digital audio equipment including the MD system of this embodiment. Data to be dealt with by this protocol are a data sequence (Audio and Music data sequence) obtained in accordance with an audio and music recording format (517).

2-3. Forms of Signal Transmission

Figure 9:
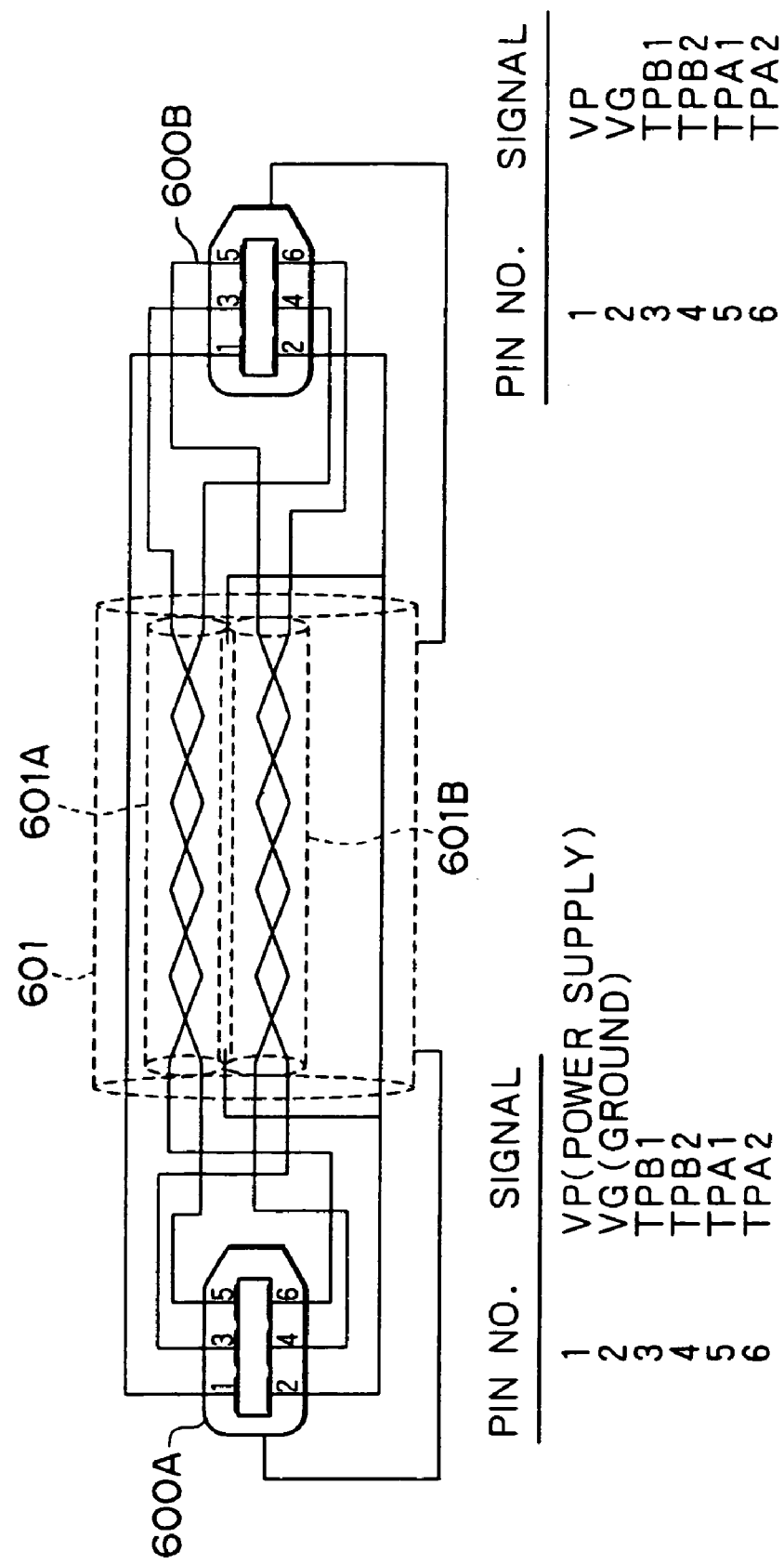
FIG. 9 is a structural view of an IEEE 1394 bus cable.

FIG. 9 depicts a typical structure of a cable actually used as an IEEE 1394 bus.

In FIG. 9, connectors 600A and 600B are connected via a cable 601. Pins numbered 1 through 6 are shown to be used as pin terminals attached to the connectors 600A and 600B.

Of the pin terminals on the connectors 600A and 600B, pin No. 1 corresponds to power supply (VP), pin No. 2 to ground (VG), pin No. 3 to TPB1, pin No. 4 to TPB2, pin No. 5 to TPA1, and pin No. 5 to TPA2.

The pins are interconnected between the connectors 600A and 600B as follows:
- pin No. 1 (VP) to pin No. 1 (VP);
- pin No. 2 (VG) to pin No. 2 (VG);
- pin No. 3 (TPB1) to pin No. 5 (TPA1);
- pin No. 4 (TPB2) to pin No. 6 (TPA2);
- pin No. 5 (TPA1) to pin No. 3 (TPB1); and
- pin No. 6 (TPA2) to pin No. 4 (TPB2).

Of the above pin connection pairs, two twisted-line pairs
- pin No. 3 (TPB1) to pin No. 5 (TPA1) and
- pin No. 4 (TPB2) to pin No. 6 (TPA2)

constitute a signal line 601A for alternately transmitting signals on a differential basis. Furthermore, another two twisted-line pairs
- pin No. 5 (TPA1) to pin No. 3 (TPB1) and
- pin No. 6 (TPA2) to pin No. 4 (TPB2)

form a signal line 601B for alternately transmitting signals also on a differential basis.

Figure 10:
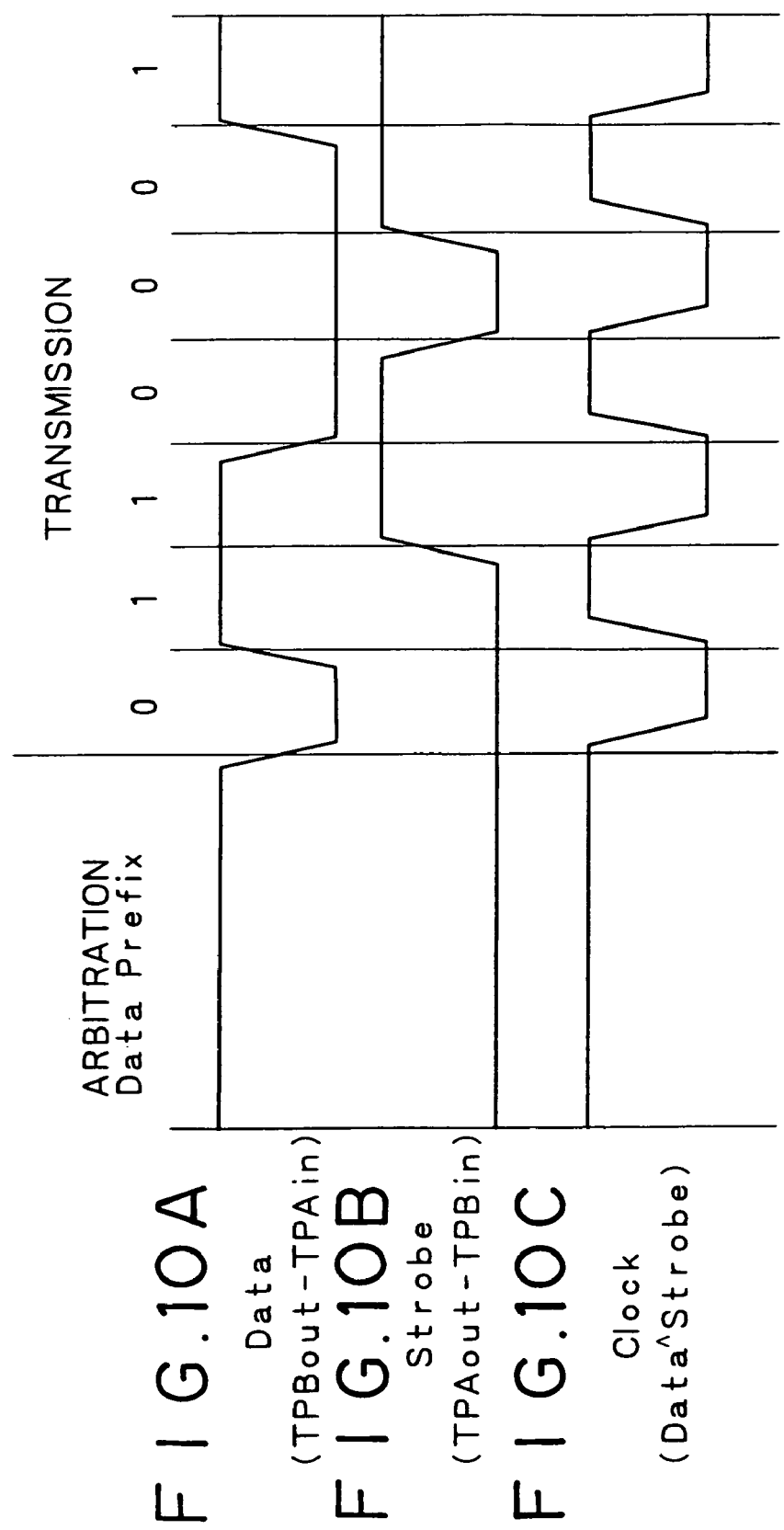
FIG. 10A is a timing chart of a DATA signal transmitted over an IEEE 1394 bus.
FIG. 10B is a timing chart of a STROBE signal transmitted over the IEEE 1394 bus.
FIG. 10C is a timing chart of a CLOCK signal transmitted over the IEEE 1394 bus.

The signals sent over the two signal lines 601A and 601B are a data signal (Data) shown in FIG. 10A and a strobe signal (Strobe) in FIG. 10B.

The data signal in FIG. 10A uses one of the signal lines 601A and 601B. This data signal is output through TPB1 and TPB2 and enters TPA1 and TPA2.

The strobe signal in FIG. 10B is obtained by performing a predetermined logic operation on the data signal and on a transmission clock synchronized with this data signal. For that reason, the strobe signal has a frequency lower than that of the actual transmission clock. The strobe signal uses one of the signal lines 601A and 601B that is not occupied for data signal transmission. Following propagation over the signal line, the strobe signal is output through TPA1 and TPA2 to enter TPB1 and TPB2.

Suppose that the data signal of FIG. 10A and strobe signal of FIG. 10B are input to a device complying with the IEEE 1394. In that case, the device carries out the appropriate logic operation on the input data signal and strobe signal to generate a transmission clock (Clock) shown in FIG. 10C. The transmission clock thus generated is used for necessary input data signal processing.

By adopting such hardware-based data transmission forms, the IEEE 1394 format eliminates the need for transferring a rapid-cycle transmission clock over cables between configured devices. This enhances the reliability of signal transmission.

Although the six-pin arrangement has been described above, this is not limitative of the invention. Alternatively, the IEEE 1394 format may omit the power supply (VP) and ground (VG) to form a four-pin arrangement consisting of two twisted-line pairs, i.e., signal lines 601A and 601B only. The MD recorder/player 1 of the embodiment may illustratively utilize such a four-pin cable arrangement to provide users with a more simplified system than ever.

2-4. Bus connection between Devices

Figure 11:
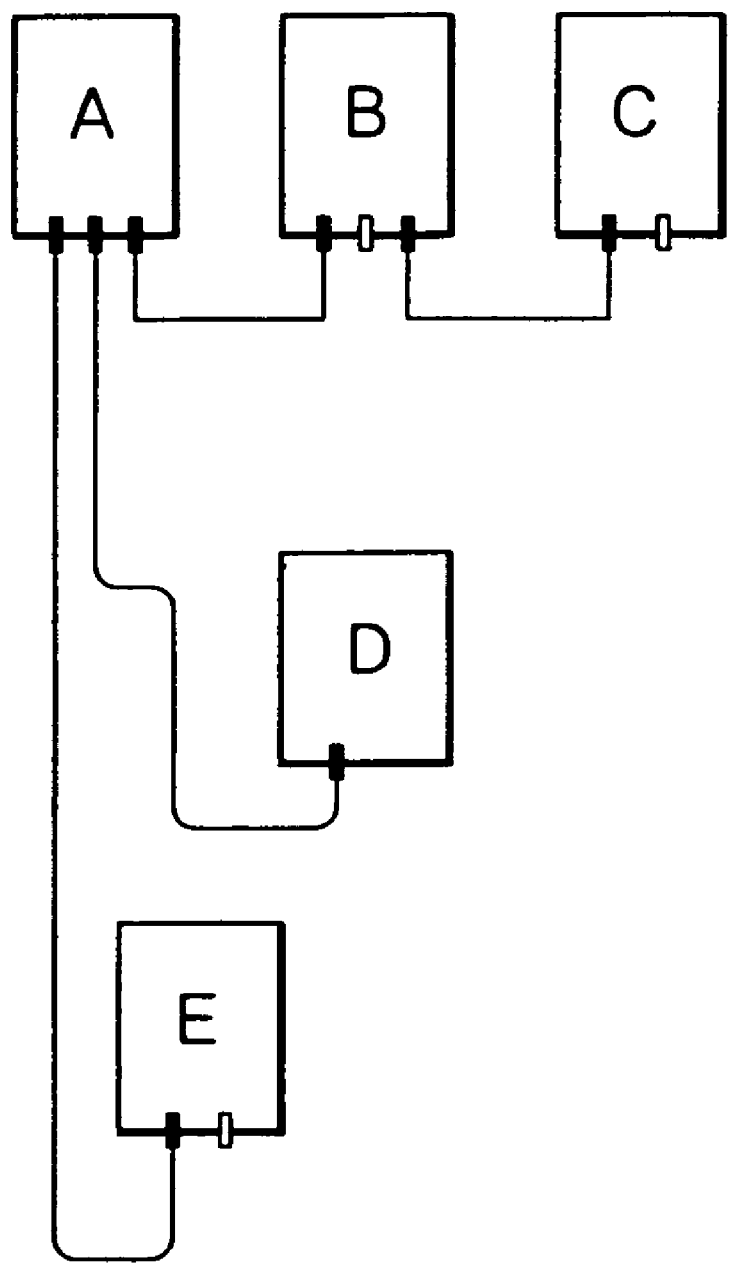
FIG. 11 is a schematic view of devices connected by an IEEE 1394 bus.

FIG. 11 illustrates schematically how devices are typically interconnected by use of IEEE 1394 buses. The setup of FIG. 11 shows five devices A through E (nodes) being connected for intercommunication via the IEEE 1394 buses.

The IEEE 1394 interface is capable of what is known as daisy-chain connection whereby apparatuses such as the devices A, B and C in FIG. 11 are serially connected through the IEEE 1394 buses. The interface also permits so-called branch connection whereby an apparatus is connected in parallel with multiple apparatuses, as in the setup of FIG. 11 in which the device A is connected parallelly with the devices B, D and E.

The system as a whole is allowed to have up to 63 devices (nodes) configured through both branch connection and daisy-chain connection. Used alone, the daisy-chain connection permits a configuration of up to 16 devices (16 pop). Terminators needed for the SCSI (Small Computer System Interface) are not necessary for the IEEE 1394 interface.

The IEEE 1394 interface allows the devices connected by such daisy-chain connection or branch connection to communicate with one another. In the setup of FIG. 11, the devices A, B, C, D and E are allowed to communicate with one another.

Within the system where a plurality of devices are connected by IEEE 1394 buses (the system is also called the IEEE 1394 system hereunder), each of the configured devices is assigned a node-ID in practice. The process of node-ID assignment is shown schematically in FIGS. 12A, 12B and 12C.

Figure 12A:
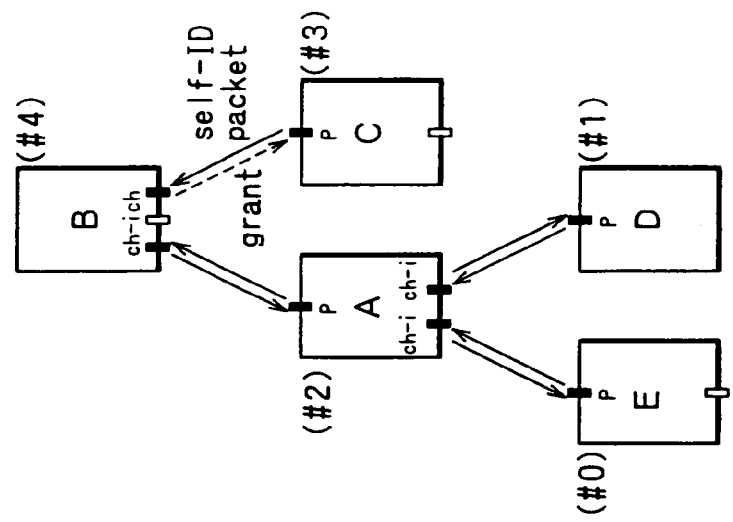
FIG. 12A is a transition diagram explaining how a bus reset notice is transmitted upon generation of a bus reset.

In an IEEE 1394 system whose connection setup is shown in FIG. 12A, a bus reset is generated if a cable is connected or disconnected, if any one of the configured devices of the system is turned on or off, or if a spontaneously generated process takes place under PHY (Physical Layer Protocol). In such a case, a bus reset notice is sent to all devices A, B, C, D and E over the IEEE 1394 buses.

Figure 12B:
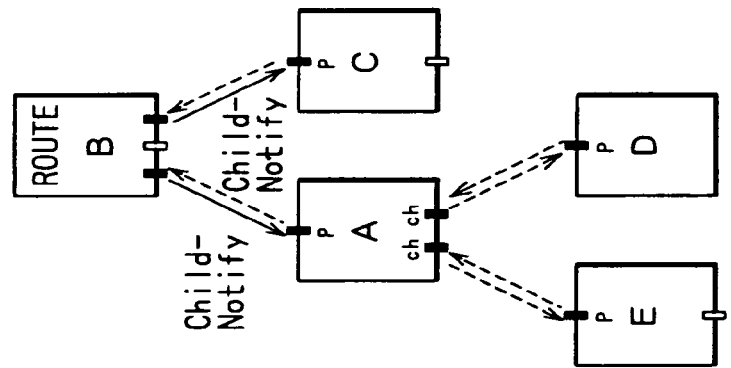
FIG. 12B is a transition diagram showing how parent-child(ren) relations are defined between devices after a bus reset.

The bus reset notice triggers communications (called Child-Notify) that result in defining parent-child relations between adjacent devices as depicted in FIG. 12B. That is, a tree structure of the configured devices is built within the IEEE 1394 system. With the tree structure established, the device constituting a root of the tree is defined. The root is a device whose terminals are all defined as "children" (Ch). In the setup of FIG. 12B, the device B is defined as the root. In other words, a terminal of the device connected to the device B as the root is defined as a "parent" (P).

Figure 12C:
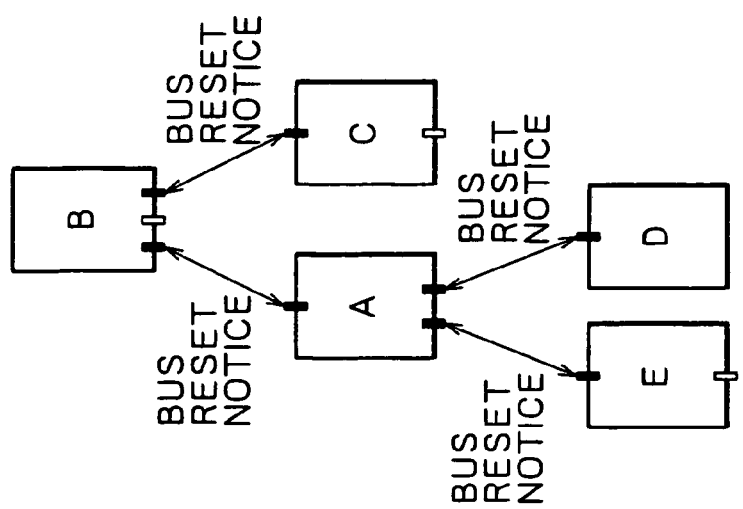
FIG. 12C is a transition diagram depicting how node IDs of devices are determined.

When the tree structure and its root have been defined in the IEEE 1394 system as described above, each device then outputs a self-ID packet as a declaration of its own node-ID as shown in FIG. 12C. The root grants one node-ID after another to the connected devices, whereby addresses (node-IDs) of the devices constituting the IEEE 1394 system are determined.

2-5. Packets

Figure 13:
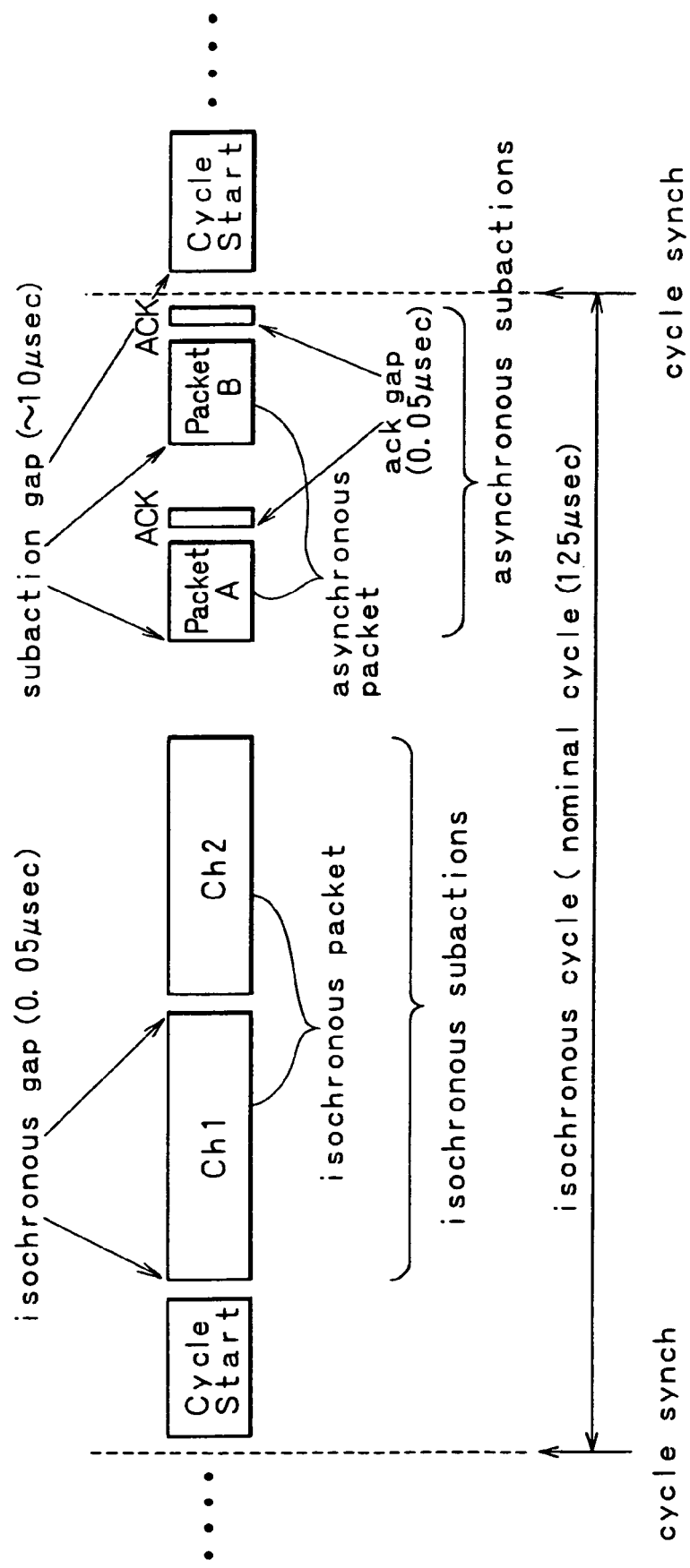
FIG. 13 is a schematic view of a cycle structure in an IEEE 1394 format.

As shown in FIG. 13, the IEEE 1394 format effects data transmission through repeated isochronous cycles (nominal cycles). It is stipulated that each isochronous cycle lasts 125 μsec on a frequency band of 100 MHz. It is also stipulated that the isochronous cycle may have a duration period other than 125 μsec. For transmission, data are turned into packets in each isochronous cycle.

As illustrated in FIG. 13, each isochronous cycle is headed by a cycle start packet indicating the beginning of the cycle. When to generate cycle start packets is designated by a device defined as a cycle master in the IEEE 1394 system. Details of the cycle start packet generation will not be described further.

Each cycle start packet is followed preferentially by isochronous packets. As shown in FIG. 13, the isochronous packets correspond to a channel each and are transferred on a time division basis (in the form of isochronous subactions). In isochronous subactions, the packets are set apart by intervals called isochronous gaps (each lasting illustratively 0.05 μsec).

As described, the IEEE 1394 system allows isochronous data to be transmitted and received over a single transmission line on a multi-channel basis.

Suppose that compressed audio data (called ATRAC data hereunder) compatible with the MD recorder/player of this embodiment are transmitted by the isochronous method. In that case, if ATRAC data are subject to a single-speed transfer rate of 1.4 Mbps, then time series continuity (i.e., real-time characteristic) is guaranteed by transmitting the ATRAC data in isochronous packets of at least 20-odd bytes per 125-μsec isochronous cycle.

For example, before transmitting ATRAC data, a device requests an IRM (Isochronous Resource Manager) in the IEEE 1394 system to grant an isochronous packet size large enough to ensure real-time transmission of the ATRAC data. In response, the IRM grants or withholds permission for the packet size by monitoring the current data transmission status. If permission is granted, the ATRAC data in question are transmitted in isochronous packets over specific channels. This procedure, of which details will not be described further, is called band reservation for the IEEE 1394 interface.

Frequency ranges not used for isochronous subactions over the isochronous cycle band are utilized for asynchronous subactions, i.e., for asynchronous transmission of packets.

FIG. 13 shows an example in which two asynchronous packets A and B are transmitted. The asynchronous packets are each followed by an ACK (acknowledge) signal, with an interval called an ack gap (0.05 μsec long) interposed therebetween. An ACK signal is output by the receiving side (i.e., target) on a hardware basis informing the transmitting side (i.e., controller) that some asynchronous data have been received during an asynchronous transaction, as will be described later.

An interval called a subaction gap about 10 μsec long is placed before and after each data transmission unit made of an asynchronous packet and an ACK signal.

Where arrangements are made to transmit ATRAC data in isochronous packets and to send auxiliary data files accompanying the ATRAC data in asynchronous packets, it is possible to transmit both the ATRAC data and the auxiliary data files in an apparently simultaneous fashion.

2-6. Transaction Rules

FIG. 14A is a process transition diagram showing basic transaction rules for asynchronous communication. The transaction rules are stipulated in compliance with the FCP.

As depicted in FIG. 14A, a requester (transmitting side) first sends a request to a responder (receiving side) in step S11. On receiving the request (in step S12), the responder sends an acknowledgement back to the requester (in step S13). When receiving the acknowledgement, the requester confirms that the request has been accepted by the responder (in step S14).

In turn, the responder sends a transaction response to the request from the requester (in step S15). Upon receipt of the response (in step S16), the requester returns an acknowledgement to the responder (in step S17). When receiving the acknowledgement, the responder verifies that its response has been received by the requester.

Request transactions transmitted in FIG. 14A fall into three categories: write requests, read requests, and lock requests, as listed in the left-hand part of the table in FIG. 14B.

Write requests are commands that designate data write operations. Read requests are commands that specify data read operations. Lock requests, though not discussed hereunder in detail, are commands for swap, compare, and mask operations.

The write requests are further grouped by the data size of the command (operand) in an asynchronous packet (AV/C command packet, to be described later with reference to figures) into three types. One write request type is a write request (data quadlet) for sending a command according to the header size alone in an asynchronous packet. The other two write request types are a write request (data block: data length=4 bytes) and a write request (data block: data length≠4 bytes). Each of the latter two write request types supplements a header of an asynchronous packet with a data block for command transmission. What makes the two write request types different from each other is that the data size of the operand placed in the data block is four bytes for one request type and something other than four bytes for the other.

As with the write requests, the read requests are further grouped by the data size of the operand in an asynchronous packet into three types: a read request (data quadlet), a read request (data block: data length=4 bytes), and a read request (data block: data length≠4 bytes).

Response transactions are listed in the right-hand part of the table in FIG. 14B. Either a write response or no response is defined as corresponding to any of the three write request types.

A read response (data quadlet) is defined as corresponding to the read request (data quadlet), and a read response (data block) as corresponding to the read request (data block: data length=4 bytes) or to the read request (data block: data length≠4 bytes).

A lock response is defined as corresponding to the lock request.

2-7. Addressing

FIGS. 15A through 15E show addressing structures of IEEE 1394 buses. As depicted in FIG. 15A, a 64-bit bus address register (address space) is provided in the IEEE 1394 format.

A high-order 10-bit region of the register designates a bus ID for identifying an IEEE 1394 bus. As shown in FIG. 15B, the region permits setting of up to 1,023 bus IDs for buses Nos. 0 through 1,022. Bus No. 1,023 is defined as a local bus.

A six-bit region following the bus address in FIG. 15A designates a node ID of a device connected to the IEEE 1394 bus identified by the bus ID. As depicted in FIG. 15C, the node ID permits identification by up to 63 node IDs numbered 0 through 62.

The 16-bit region comprising the bus ID and node ID above corresponds to a destination ID in a header of an AV/C command packet, to be described later. In the IEEE 1394 system, each device connected to a specific bus is identified by the bus ID and node ID.

A 20-bit region following the node ID in FIG. 15A constitutes a register space. The register space is followed by a 28-bit register address.

The register space has a value [F FF FFh] indicating the register shown in FIG. 15D. The content of this register is defined as depicted in FIG. 15E. The register address designates the address of the register shown in FIG. 15E.

In brief, addressing works as follows: information about an isochronous cycle time and free channels is obtained by referring to serial bus-dependent registers starting illustratively from address 512 [0 00 02 00h] in the register of FIG. 15E.

A configuration ROM starting at address 1024 [0 00 04 00h] accommodates node-related information such as node unique IDs and subunit IDs. A node unique ID and a subunit ID are needed to establish connective relations of a device identified by these IDs when that device is actually connected to the IEEE 1394 bus.

The node unique ID is eight-byte device information unique to each device. No two devices share the same node unique ID even if they are of the same model.

The subunit ID is constituted by a vender name (module_vender_ID) indicating the manufacturer of a given device as a node, and by a model name (model_ID) designating the model name of that node.

As mentioned above, the node unique ID is information uniquely identifying each device in eight bits. No two devices, even of the same model, share the same node unique ID. On the other hand, the vender name is information identifying the manufacturer of a given node and the model name is information identifying the model of that node. This means that a plurality of devices may share the same vender name and the same model name.

Making a reference to the content of the configuration ROM thus reveals the node unique ID of the device in question. The subunit ID when referenced identifies the vender and model of the node represented by the device of interest. The node unique ID is mandatory while the vender name and model name are optional; the latter two names need not be set imperatively to every device.

2-8. CIP

FIG. 16 illustrates a structure of a CIP (common isochronous packet). This is a data structure of the isochronous packet shown in FIG. 13. In IEEE 1394-compatible communications, as mentioned above, ATRAC data (one type of audio data to be recorded and reproduced by the MD recorder/player of this embodiment) are transmitted and received by the isochronous method. That is, quantities of data sufficient to maintain the real-time characteristic are carried by isochronous packets that are transmitted one after another in isochronous cycles.

The first 32 bits (making up a quadlet) of the CIP constitute a 1394 packet header. In this packet header, a high-order 16-bit region indicates a data_length followed by a two-bit region that designates a tag. The tag is followed by a six-bit region designating a channel. The channel region is followed by a four-bit designating "tcode" which in turn is followed by a four-bit "sy" code. A quadlet region following the 1394 packet header contains a header_CRC.

A two-quadlet region following the header_CRC constitutes a CIP header. In the high-order quadlet of the CIP header, the most significant two bits are each filled with a "0". A six-bit region after the "00" bits indicates an SID (transmitting node number), followed by an eight-bit region designating a DBS (data block size, i.e., increment of data for packet formation). The DBS region is followed by an FN (of two bits) and a QPC (of three bits) region. The FN region denotes the number of segments for packet formation, and the QPC region represents the number of quadlets added for segmentation.

The QPC region is followed by an SPH (of one bit) region that indicates a flag of the header in a source packet. A DBC region contains a value of a counter for detecting dropped packets.

High-order two bits in the low-order quadlet of the CIP header are filled with a "1" and a "0." The "00" bits are followed by an FMT (of six bits) and an FDF (of 24 bits) region. The FMT region denotes a signal format whose value permits identification of a type of data (i.e., data format) placed in this CIP. More specifically, such data types as MPEG stream data, audio stream data, and digital video camera (DV) stream data may be identified by the FMT region. The data format given in the FMT region corresponds illustratively to a transmission protocol such as the SD-DVCR Real time Transmission (502), HD-DVCR Real time Transmission (503), SDL-DVCR Real time Transmission (504), MPEG2-TS Real time Transmission (505), or Audio and Music Real time Transmission (506) under management of the CIP header format (401) shown in FIG. 8.

The FDF region is a format-dependent field designating a more detailed category of the data format classified by the FMT region. Illustratively, audio data may be identified in more detail as linear audio data or MIDI data.

For example, ATRAC data for use with this embodiment are first indicated as data falling under the category of audio stream data in the FMT region. With a predetermined value set to the FDF region, the audio stream data are further shown to be ATRAC data.

If the FMT region indicates MPEG data, then the FDF region holds synchronization control information called a TSF (time shift flag). If the FMT region denotes DVCR (digital video camera) data, the FDF region is defined as shown in the lower part of FIG. 16. This FDF region has a high-order 50/60 region (of one bit) designating the number of fields per seconds, followed by an STYPE region (of five bits) indicating whether the video format is SD or HD. The STYPE region is followed by an SYT region that provides a time stamp for frame synchronization.

Following the CIP header, the data indicated by the FMT and FDF regions are stored in a sequence of "n" data blocks. If the data are shown to be ATRAC data by the FMT and FDF regions, the data blocks contain the ATRAC data. The data blocks are terminated by a data_CRC region.

2-9. Connection Management

In the IEEE 1394 format, logical connections called "plugs" are used to define connective relations between devices connected by IEEE 1394 buses.

FIG. 17 shows a typical setup of connective relations defined by plugs. The setup constitutes a system having VTR1, VTR2, a set-top box (STB; digital satellite broadcast tuner), a monitor, and a digital still camera all connected via an IEEE 1394 bus.

There are two forms of plug-based IEEE 1394 connections: point-to-point connection, and broadcast connection.

The point-to-point connection specifies relations between a transmitting device and a receiving device. Data transmission takes place over a specific channel from the transmitting device to the receiving device.

On the other hand, the broadcast connection permits data transmission without requiring the transmitting device to specify receiving devices and channels to be utilized. The receiving devices receive the transmitted data without identifying the transmitting device and perform predetermined processes if so required by the content of the received data.

The setup of FIG. 17 shows two point-to-point connection states: one in which the STB send data and the VTR1 receives the data over channel No. 1, and the other in which the digital still camera sends data and the VTR2 receives the data over channel No. 2.

Also shown in FIG. 17 is a broadcast connection state for the digital still camera to transmit its data on a broadcasting basis. The broadcast data are shown being received by the monitor which in turn performs a predetermined response process.

The above connections (plugs) are established by a PCR (plug control register) included in an address space of each device configured.

Figure 18A:
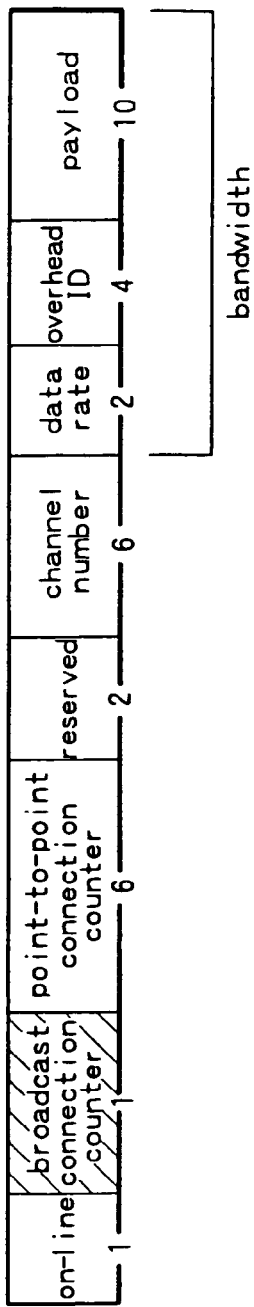
FIG. 18A is a schematic view of a data structure in an output plug control register oPCR[n]
Figure 18B:
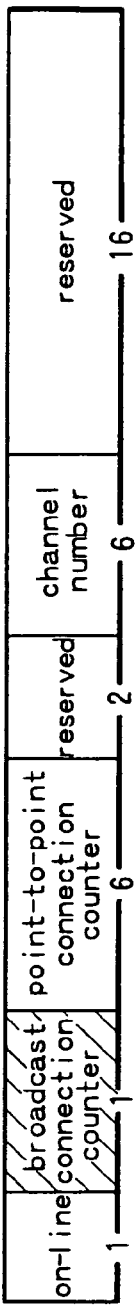
FIG. 18B is a schematic view of a data structure in an input plug control register iPCR[n]

FIG. 18A depicts a structure of a plug control register for output (oPCR[n]), and FIG. 18B indicates a structure of a plug control register for input (iPCR[n]). The registers oPCR[n] and iPCR[n] have a size of 32 bits each.

In the register oPCR of FIG. 18A, illustratively a "1" set to the most significant bit (on-line) indicates that the plug is in an online state and capable of isochronous data transmission. A "1" set to the next bit (broadcast connection counter) denotes broadcast connection transmission. A six-bit "point-to-point connection counter" field that follows the "broadcast connection counter" bit indicates the number of point-to-point connections linked with the plug in question. A "channel number" field ranging from the eleventh to the sixth bit relative to the MSB indicates the number of the channel over which data are transmitted.

In the register iPCR of FIG. 18B, illustratively a "1" set to the most significant bit (on-line) indicates that the plug in question is in an online state and capable of receiving isochronous data. A "1" set to the next bit (broadcast connection counter) denotes broadcast connection reception. A six-bit "point-to-point connection counter" field that follows the "broadcast connection counter" bit indicates the number of point-to-point connections linked with the plug in question. A "channel number" field ranging from the eleventh to the sixth bit relative to the MSB indicates the number of the channel over which data are received.

A broadcast connection counter in each of the register OPCR of FIG. 18A and the register iPCR of FIG. 18B accommodates the number of nodes linked by broadcast connections in a broadcast connection-based transmission/reception setup.

A point-to-point connection counter in each of the register OPCR of FIG. 18A and the register iPCR of FIG. 18B stores the number of nodes linked by point-to-point connections in a point-to-point connection-based transmission/reception setup.

If the broadcast connection is set in the register oPCR[n], the output side sends out data regardless of electronic devices that may be connected. If the point-to-point connection is set in the register oPCR[n], the output side establishes interconnected relations with connected electronic devices so that these devices are linked with one another.

2-10. Commands and Responses under FCP

Transmission of data by the asynchronous method is regulated under the FCP (402) shown in FIG. 8. Below is a description of a transaction for the transmission governed by the FCP.

A write transaction (see FIG. 14B) prescribed for the asynchronous method is used under the FCP. Auxiliary data are thus transmitted by this embodiment by utilizing write transactions for asynchronous communication in keeping with the FCP.

Each of the devices that support the FCP comprises a command/response register. A write transaction is implemented by writing a message to the command/response register as will be explained below with reference to FIG. 19.

Figure 19:
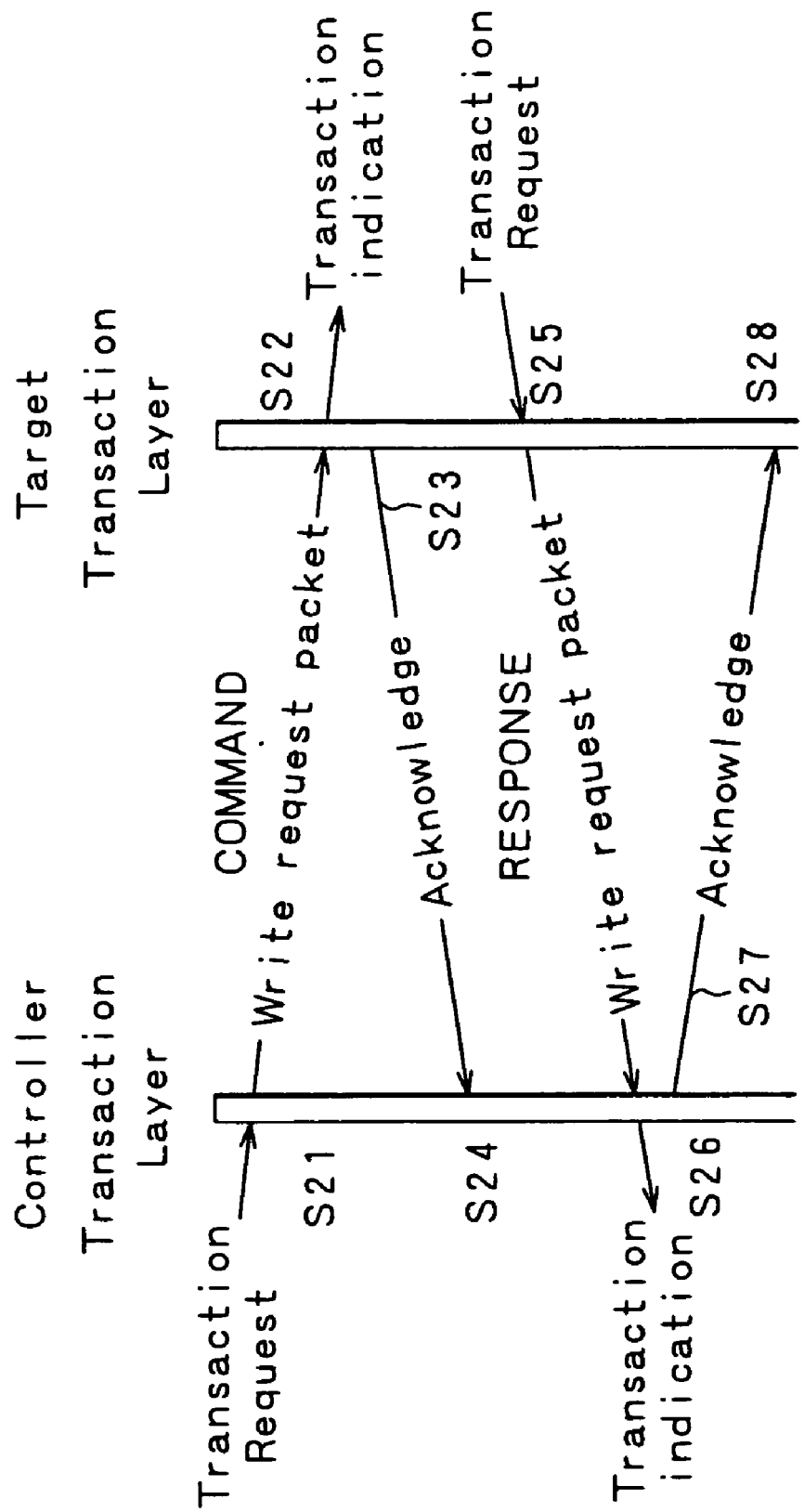
FIG. 19 is a process transition diagram in effect when messages are written to command/response registers.

FIG. 19 shows a process transition diagram wherein in step S21 a controller generates a transaction request and sends a write request packet to a target for a command transmission. In step S22, the target receives the write request packet and writes data to the command/response register. The target returns an acknowledgement to the controller in step S23, and the controller receives the acknowledgement in step S24. The steps so far constitute a command transmission process.

In a process responding to the command, the target transmits a write request packet (in step S25). On receiving the write request packet, the controller writes data to the command/response register (in step S26). With the write request packet received, the controller also transmits an acknowledgement to the target (in step S27). Receiving the acknowledgement allows the target to confirm that the write request packet has been received by the controller (in step S28).

That is, data transmission (transactions) according to the FCP is based on two processes: the process of command transmission from the controller to the target, and the process of response transmission from the target to the controller.

2-11. AV/C Command Packet

As described earlier in reference to FIG. 8, the FCP allows various AV devices to communicate by the asynchronous method using AV/C commands.

Three kinds of transactions, i.e., write, read and lock, are prescribed for asynchronous communication, as explained with reference to FIG. 14B. In practice, a write request/response packet, a read request/response packet, and a lock request/response packet are used in keeping with the different transactions. For the FCP, the write transaction is employed as described above.

Figure 20:
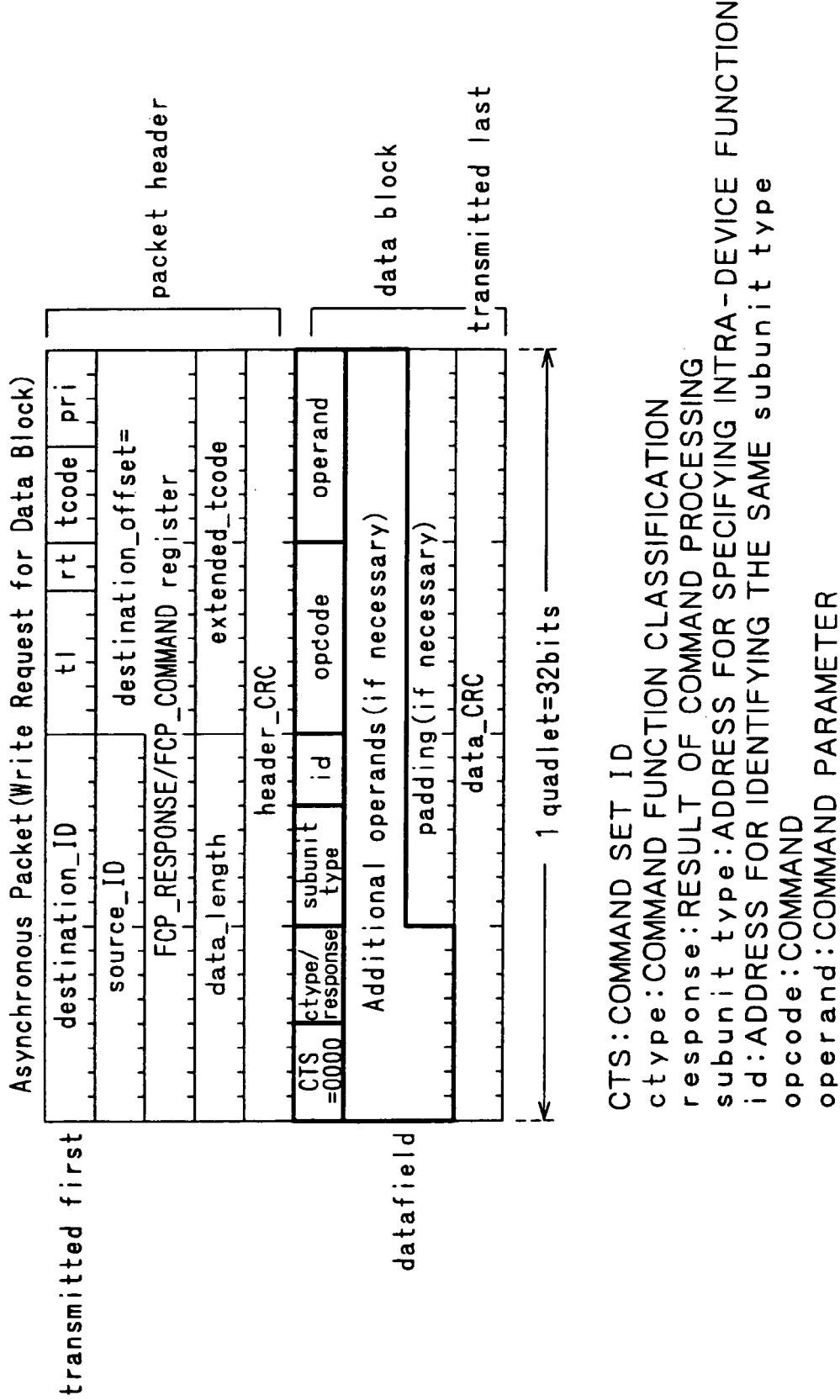
FIG. 20 is a schematic view of a data structure in an asynchronous packet.

FIG. 20 shows a format of a write request packet (asynchronous packet (Write Request for Data Block)). This embodiment uses the write request packet as its AV/C command packet.

High-order five quadlets (i.e., the first through the fifth quadlets) in the write request packet constitute a packet header. A high-order 16-bit region in the first quadlet of the packet header denotes a destination_ID, i.e., an ID of a node serving as a data transfer destination. The destination_ID region is followed by a six-bit "tl" (transact label) region representing a packet number. The six-bit region is followed by a two-bit "rt" (retry code) region indicating whether the packet in question is the initially transmitted packet or a retransmitted packet. The "rt" region is followed by a four-bit "tcode" (transaction code) region designating a command code. The "tcode" region is followed by a four-bit "pri" (priority) region indicating the priority of the packet.

A high-order 16-bit region in the second quadlet of the packet header denotes a source_ID, i.e., an ID of a node serving as a data transfer source.

A low-order 16-bit region in the second quadlet and the entire third quadlet, occupying a total of 48 bits, designate a destination_offset indicating two addresses: one for a command register (FCP_COMMAND register), and the other for a response register (FCP_RESPONSE register).

The destination_ID and destination_offset correspond to the 64-bit address space stipulated in the IEEE 1394 format.

A high-order 16-bit region in the fourth quadlet contains a data_length. This region designates the data size of a datafield, to be described later (shown enclosed by thick lines in FIG. 20). The data_length region is followed by a 16-bit extended_tcode region used when the tcode is extended.

A 32-bit region making up the fifth quadlet indicates a header_CRC. This region contains a CRC-computed value to checksum the packet header.

Data blocks are arranged starting from the sixth quadlet following the packet header. A datafield is formed at the beginning of data blocks.

High-order four bits forming the datafield heading the sixth quadlet describe a CTS (command and transaction set). The CTS region indicates an ID of a command set for the write request packet in question. For example, a CTS value of "0000" as shown in FIG. 20 defines the content of the datafield as an AV/C command. In other words, the write request packet is identified as an AV/C command packet. Thus with this embodiment, the CTS region is filled with "0000" to let the FCP use AV/C commands.

A four-bit region following the CTS has a response written therein indicating the result (i.e., response) of a process corresponding to a "ctype" (command type, i.e., a command function classification) or to a command.

FIG. 21 lists definitions of the command types (ctype) and responses mentioned above. Values [0000] through [0111] are defined for use as "ctype" (commands). Specifically, the value [0000] is defined as CONTROL, [0001] as STATUS, [0010] as INQUIRY, and [0011] as NOTIFY. Values [0100] through [0111] are currently undefined (reserved).

CONTROL is a command used to control functions externally; STATUS is a command for inquiring status from the outside; INQUIRY is a command utilized to inquire externally the presence or absence of support for control commands; and NOTIFY is a command employed to request that an external entity be notified of status change.

Values [1000] through [1111] are defined for use as responses. Specifically, the value [1000] is defined as NOT IMPLEMENTED; [1001] as ACCEPTED; [1010] as REJECTED; [1011] as IN TRANSITION; [1100] as IMPLEMENTED/STABLE; [1101] as CHANGED; [1110] as reserved; and [1111] as INTERIM.

The responses above are used selectively depending on the command type. For example, one of four responses NOT IMPLEMENTED, ACCEPTED, REJECTED and INTERIM is employed selectively depending on the status of the responder.

In FIG. 20, the ctype/response region is followed by a five-bit region that contains a subunit type. The subunit type designates a subunit (device) that serves as a destination of command transmission or as a source of response transmission. In the IEEE 1394 format, each device is called a unit and a functional unit within the unit is called a subunit. Illustratively, a typical VTR as a unit comprises two subunits: a tuner for receiving terrestrial and satellite broadcasts, and a video cassette recorder/player.

Subunit types are defined illustratively as shown in FIG. 22A. Specifically, a value [0000] is defined as a monitor while [0000] through [0001] are reserved. A value [0001] is defined as a disc recorder/player, [0010] as a VCR, [0010] as a tuner, [0111] as a camera, and [1000] through [1111] are reserved. A value [1111] is defined as a unit for use where no subunit exists.

In FIG. 20, a three-bit region following the subunit type region contains an "id" (node_ID) for identifying a subunit if there exist a plurality of subunits of the same type.

An eight-bit region following the "id" (node_ID) region contains an opcode which in turn is followed by an operand. The opcode stands for an operation code. The operand contains information (parameter) needed by the opcode. Opcodes are defined for each subunit in an opcode list table specific to the subunit in question. Illustratively, if the subunit is a VCR, diverse commands such as PLAY (playback) and RECORD (recording) are defined for the subunit as shown in FIG. 22B. An operand is defined for each opcode.

A 32-bit region constituting the sixth quadlet in FIG. 20 is a mandatory datafield. If necessary, operands may be added after this datafield (shown as additional operands).

The datafield is followed by a data_CRC region. Padding may be placed before the data_CRC region where necessary.

2-12. Plugs

Described below is general information about plugs in the IEEE 1394 format. As described above with reference to FIGS. 18A and 18B, plugs represent logical connections between devices in keeping with the IEEE 1394 format.

Figure 23:
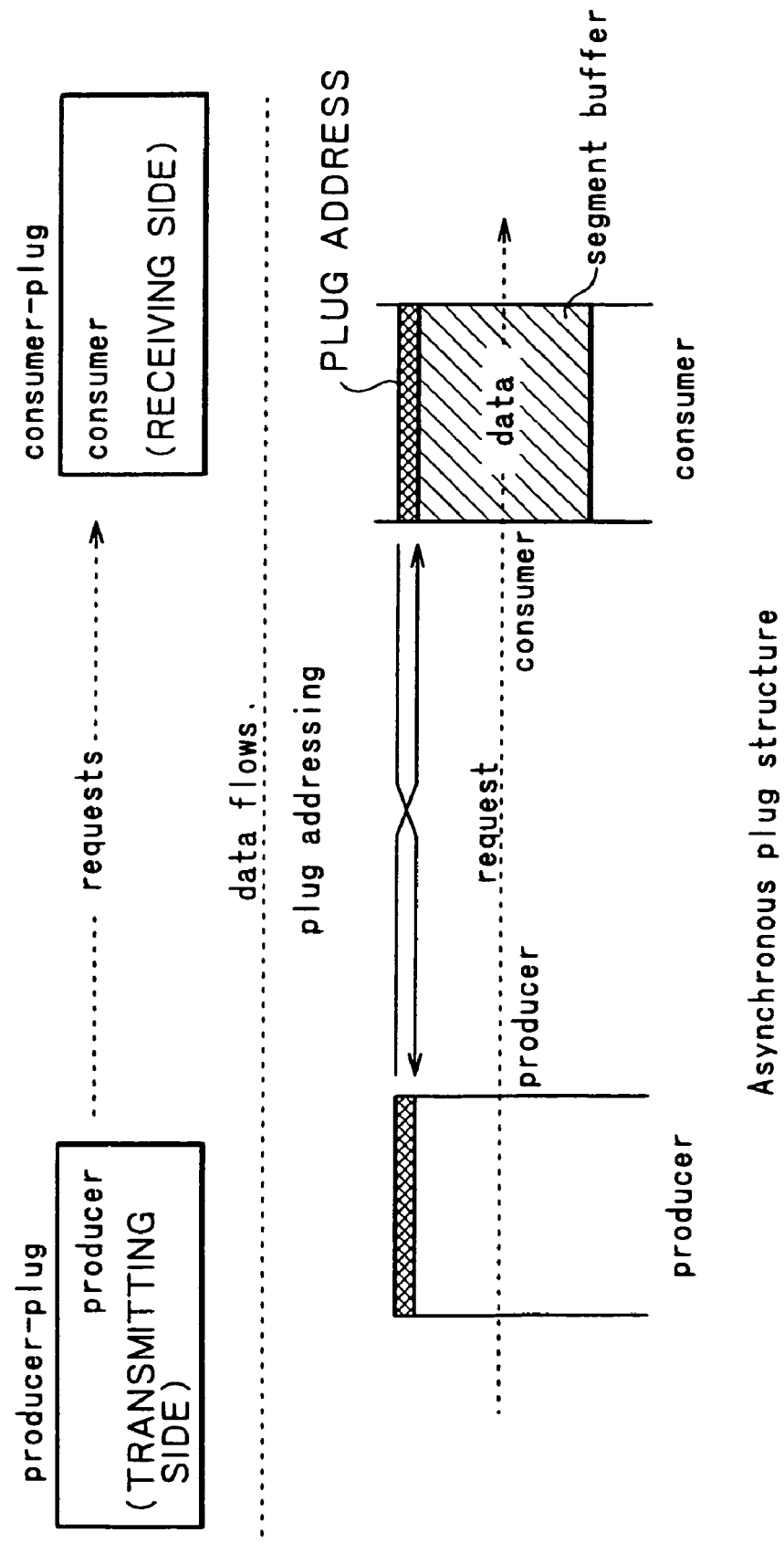
FIG. 23 is an explanatory view of an asynchronous plug structure.

Data such as commands (requests) effective in asynchronous communication are sent from a producer to a consumer, as illustrated in FIG. 23. The producer stands for a device acting as a transmitter and the consumer denotes a device serving as a receiver in accordance with the IEEE 1394 interface. The consumer has a segment buffer, shown shaded in FIG. 23, which accommodates data written by the producer.

In the IEEE 1394 system, information for designating specific devices as the producer and consumer (the information is called Connection Management Information) is retained at predetermined plug address locations indicated by braided lines in FIG. 23. The segment buffer is located following the plug address.

The range of segment buffer addresses to which the consumer may write data (the range thus denotes a recordable data quantity) is prescribed by a limit count register managed on the consumer side, as will be described later.

Figures 24A, 24B, 24C:
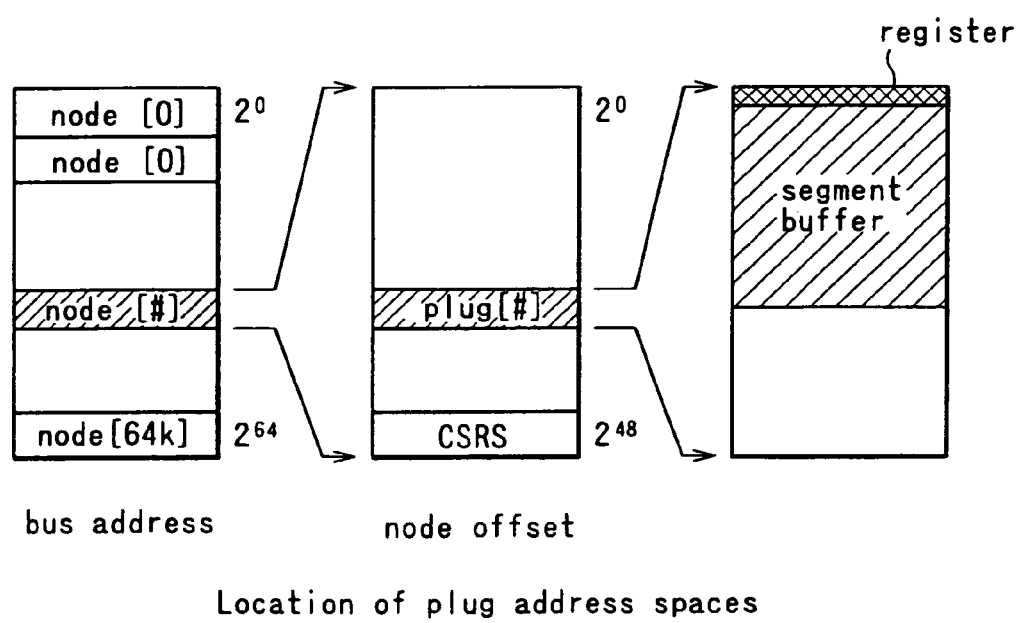
FIG. 24A is a view of a data structure in connection with locations of plug address spaces.
FIG. 24B is a view of a node offset data structure with regard to locations of plug address spaces.
FIG. 24C is a view of a plug data structure associated with locations of plug address spaces.

FIGS. 24A, 24B and 24C depict a structure of plug address spaces for asynchronous communication. A 64-bit plug address space is divided as shown in FIG. 24A into as many as $2^{16}$ (64K) nodes, in such a manner that a plug is found in the address space of each node as depicted in FIG. 24B. Each plug includes a register indicated by braided lines and a segment buffer shown shaded as illustrated in FIG. 24C. The register accommodates information (e.g., transmitted data size and receivable data size) necessary for exchanging data between the transmitting side (producer) and the receiving side (consumer), as will be explained later.

The segment buffer is an area to which to write the data sent from the producer to the consumer. It is stipulated illustratively that a minimum segment buffer size is 64 bytes.

FIG. 25A shows a typical plug address whose content is the same as that in FIG. 24C. As shown in FIG. 25A, a plug address is headed by the register which is followed by the segment buffer.

An internal structure of the register, as indicated in FIG. 25B, is headed by a 32-bit producer count register followed by limit count registers [1] through [14] of 32 bits in size each. That is, one producer count register and 14 limit count registers make up the register. In this structure, an unused region comes behind the limit count register [14].

The plug structure illustrated in FIGS. 25A and 25B is designated by offset addresses shown in FIG. 25C. Offset address 0 specifies a consumer port (producer count register) while offset addresses 4, 8, 12 through 56, and 60 designate producer ports [1] through [14]. Offset address 64 designates a segment buffer.

FIGS. 26A and 26B show plug structures for both the producer and the consumer. With such plug structures in effect, asynchronous communication is implemented by writing data to the producer count register, to the limit count registers and to the segment buffer in keeping with data exchange procedures which will be described later. The write operations fall under the category of the write transaction described above.

The producer writes data to the producer count register of the consumer. More specifically, the producer first writes information about data transmission on the producer side to the producer count register at an address specific to the producer. The content of the producer count register is then written to the producer count register on the consumer side.

The producer count register accommodates the size of data to be written in a single write operation by the producer to the segment buffer of the consumer. That is, the producer that writes data to the producer count register performs a process of reporting the size of data to be written to the consumer segment buffer.

In response, the consumer writes data to the limit count registers of the producer. More specifically, the consumer first writes the size of its segment buffer to one of the limit count registers 1 through 14 (register [n]) which is designated corresponding to the producer. The content of the limit count register [n] is then written to the limit count register [n] of the producer.

In accordance with the data written to its limit count register [n], the producer determines the size of data to be written in a single write operation illustratively to its own segment buffer. The content of the segment buffer is in turn written to the segment buffer of the consumer. The write operation to the consumer segment buffer constitutes a data transmission of asynchronous communication.

2-13. Asynchronous Connection Transmission Procedures

Figure 27:
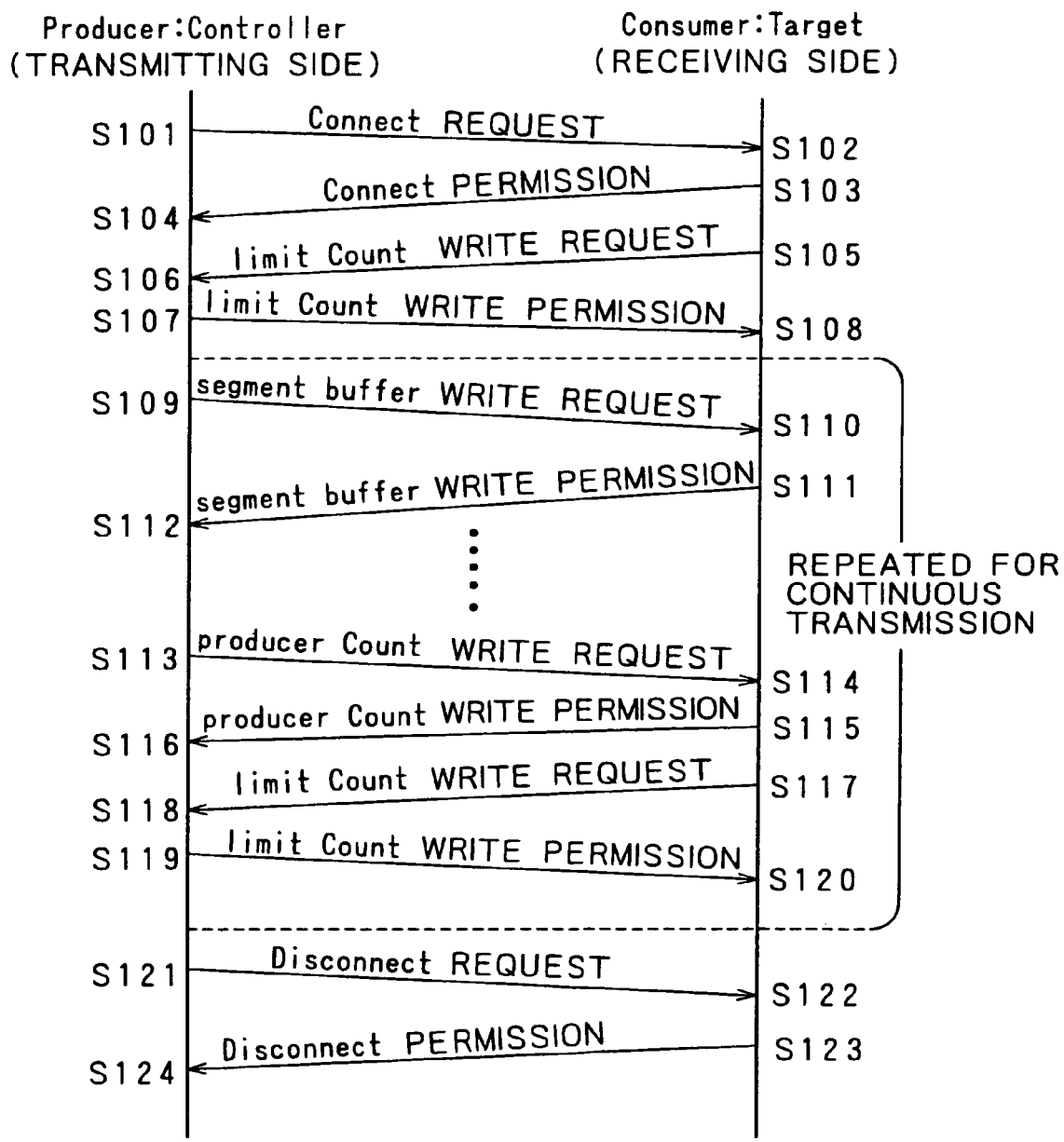
FIG. 27 is a transition diagram of command transactions between a producer and a consumer.

Described below with reference to a process transition diagram in FIG. 27 are basic procedures for transmission and reception by asynchronous connection where the inter-plug (i.e., producer-consumer) structure of FIGS. 26A and 26B is assumed to be established.

The transmission and reception procedures shown in FIG. 27 are implemented using AV/C commands (write request packets) in an environment stipulated by the FCP for asynchronous communication. Auxiliary data handled by this embodiment are transmitted and received by use of the procedures within the IEEE 1394 system. It should be noted that the processing shown in FIGS. 26A and 26B indicates only communicating operations by means of asynchronous connection; a communication process addressing the recording and playback of auxiliary data will be described later.

In an actual asynchronous connection setup, acknowledgements are sent and received following command transmissions as shown in FIG. 19. The setup of FIG. 27 omits illustration of acknowledgement exchanges for purpose of simplification.

For the IEEE 1394 interface, inter-plug (i.e., device-to-device) connective relations include controller-target relations in addition to the above-described producer-consumer relations. In the IEEE 1394 system, the devices established in producer-consumer relations may or may not coincide with the devices that are arranged in controller-target relations. In other words, there may exist a device stipulated to offer controller functions in addition to the devices designated as producers. In this example, however, it is assumed that the producer-consumer relations coincide with the controller-target relations.

In step S101 in the transmission procedures of FIG. 27, a producer transmits a connect request to a consumer. The connect request is a command sent by the producer to the consumer for requesting a connection therebetween. The command informs the consumer of a register address of the producer.

The connect request is received by the consumer in step S102, whereupon the consumer recognizes the address of the register on the producer side. In step S103, the consumer transmits in response a connect permission to the producer. Upon receipt of the connect permission by the producer in step S104, a connection is established between the producer and the consumer for subsequent data transmission and reception thereby.

With the connection set up as described above, the consumer transmits a limit count register (abbreviated to the limit count hereunder) write request to the producer in step S105. After receiving the limit count write request in step S106, the producer transmits a limit count write permission to the consumer in step S107. In step S108, the consumer receives the limit count write permission. The sending of the limit count write request followed by the write permission is a process that determines the size of data to be written later to the segment buffer (i.e., segment buffer size).

In step S109, the producer transmits a segment buffer write request to the consumer. The segment buffer write request is received by the consumer in step S110. In response, the consumer transmits a segment buffer write permission to the producer in step S111. The producer receives the segment buffer write permission in step S112.

Carrying out steps S109 through S112 completes a single process of writing data from the segment buffer of the producer to the segment buffer of the consumer.

In steps S109 through S112, the data are written by transmission of a single asynchronous packet shown in FIG. 13. If the data size transferred in an asynchronous packet is less than the data size designated by the limit count register and if the transmission of the necessary data is not complete using the single asynchronous packet, then steps S109 through S112 are repeated until the segment buffer capacity is full.

When the write operation to the segment buffer is completed in steps S109 through S112, step S113 is carried out in which the producer transmits a producer count register (abbreviated to the producer count hereunder) write request to the consumer. The consumer receives the producer count write request in step S114 and performs a write operation to its producer count register. In step S115, the consumer transmits a producer count write permission to the producer. The producer receives the producer count write permission in step S116.

The process above notifies the consumer of the data size transferred in steps S109 through S112 from the producer to the consumer segment buffer.

In step S117, a process is initiated to perform a limit count write operation following the producer count write process made up of steps S113 through S116. Specifically, as shown in steps S117 through S120, a limit count write request is transmitted from the consumer to the producer. In response, the producer transmits a limit count write permission to the consumer.

Steps S109 through S120 above constitute a single set of procedures for data transmission by asynchronous connection. If the size of data to be transmitted is greater than the segment buffer size and if the transmission of the data is not complete in a series of steps S109 through S120, then steps S109 through S120 are repeated until the data transmission is completed.

When the data transmission is completed, the producer in step S121 transmits a disconnect request to the consumer. The consumer receives the disconnect request in step S122, and transmits a disconnect permission in step S123. The producer receives the disconnect permission in step S124, which completes the data transmission and reception by asynchronous connection.

3. Node Classification Process

As described above, the STR 60 of this embodiment is capable of constituting an audio component system when combined with other STR-compatible devices such as the CD device 30 and MD device 1.

In such a system makeup, the STR 60 or an STR-compatible device detects nodes currently connected to the IEEE 1394 bus and classifies them into groups by vender and by model in accordance with predetermined rules. All nodes on the IEEE 1394 bus are thus classified. When component devices are controlled for a display indicative of their selected status contingent on the power state of the STR 60, as will be described later, the node classification is performed to distinguish the devices to be controlled from those not subject to control.

What follows is a description of the node classification process performed by this embodiment.

With this embodiment, nodes are to be classified into eight groups as described below. The node groups are numbered 1 through 8 for purpose of explanation and illustration.

No. 1 group: STR-compatible CD devices
No. 2 group: STR-compatible MD devices
No. 3 group: CD devices form the same vender
No. 4 group: MD devices from the same vender
No. 5 group: CD or MD devices from a different vender
No. 6 group: devices other than a CD or MD device and from the same vender (including those made up of a plurality of subunits each)
No. 7 group: devices other than a CD or MD device, which come from a different vender, and which include a disc device, a turner or a VCR as a subunit each
No. 8 group: others At present, the classification above is based on the premise that as devices from the same vender, only a CD device and an MD device are connected to the STR 60 whose subunit is assumed to be a disc device (a disc recorder/player, to be more precise). That is, devices compatible with the DVD or other disc media are excluded. It follows that devices from the same vender as that of the STR 60 are classified into any of the groups numbered 1, 2, 3, 4 and 6.

Figure 28:
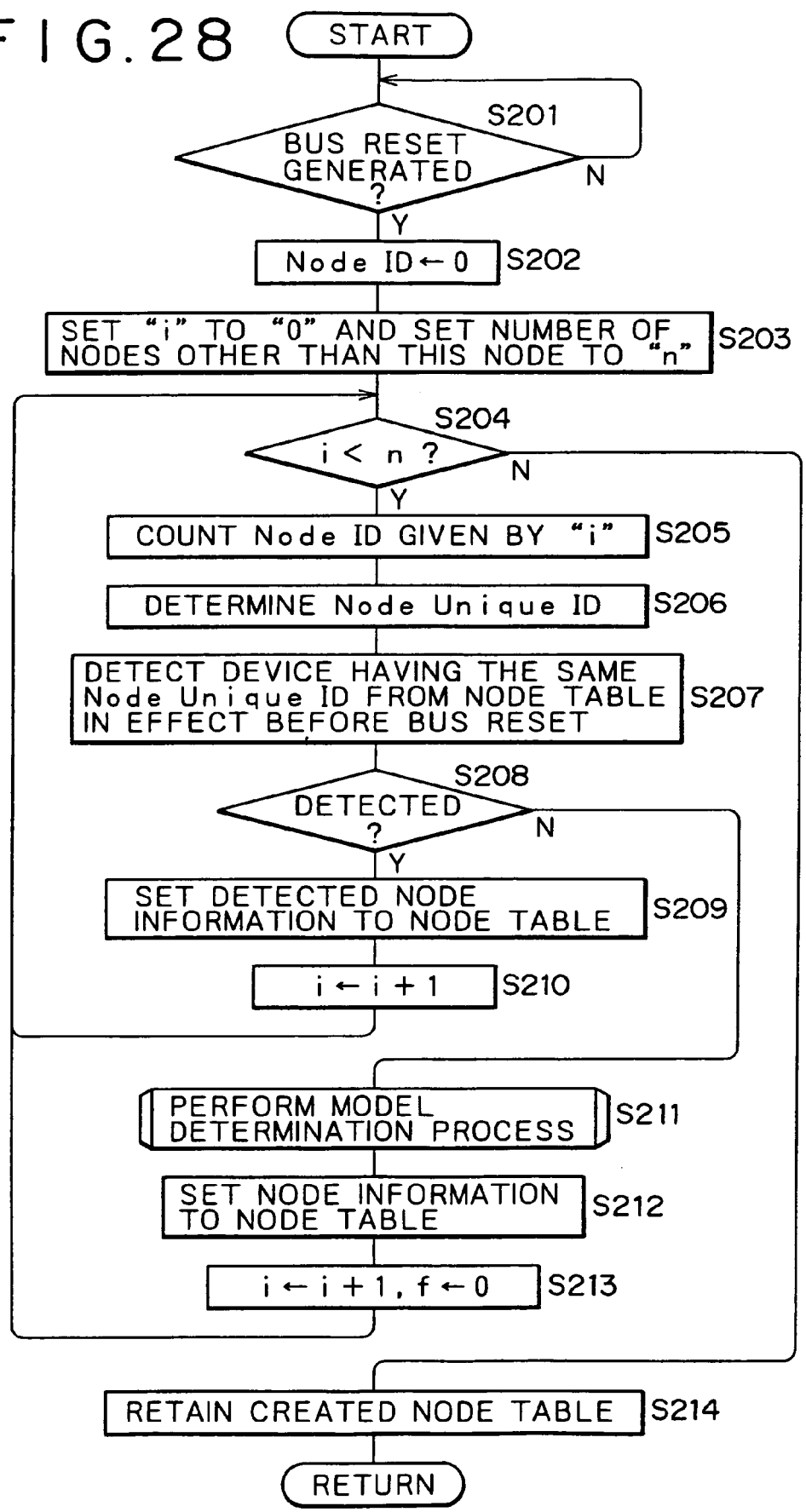
FIG. 28 is a flowchart of steps constituting a node classification process.
Figure 29:
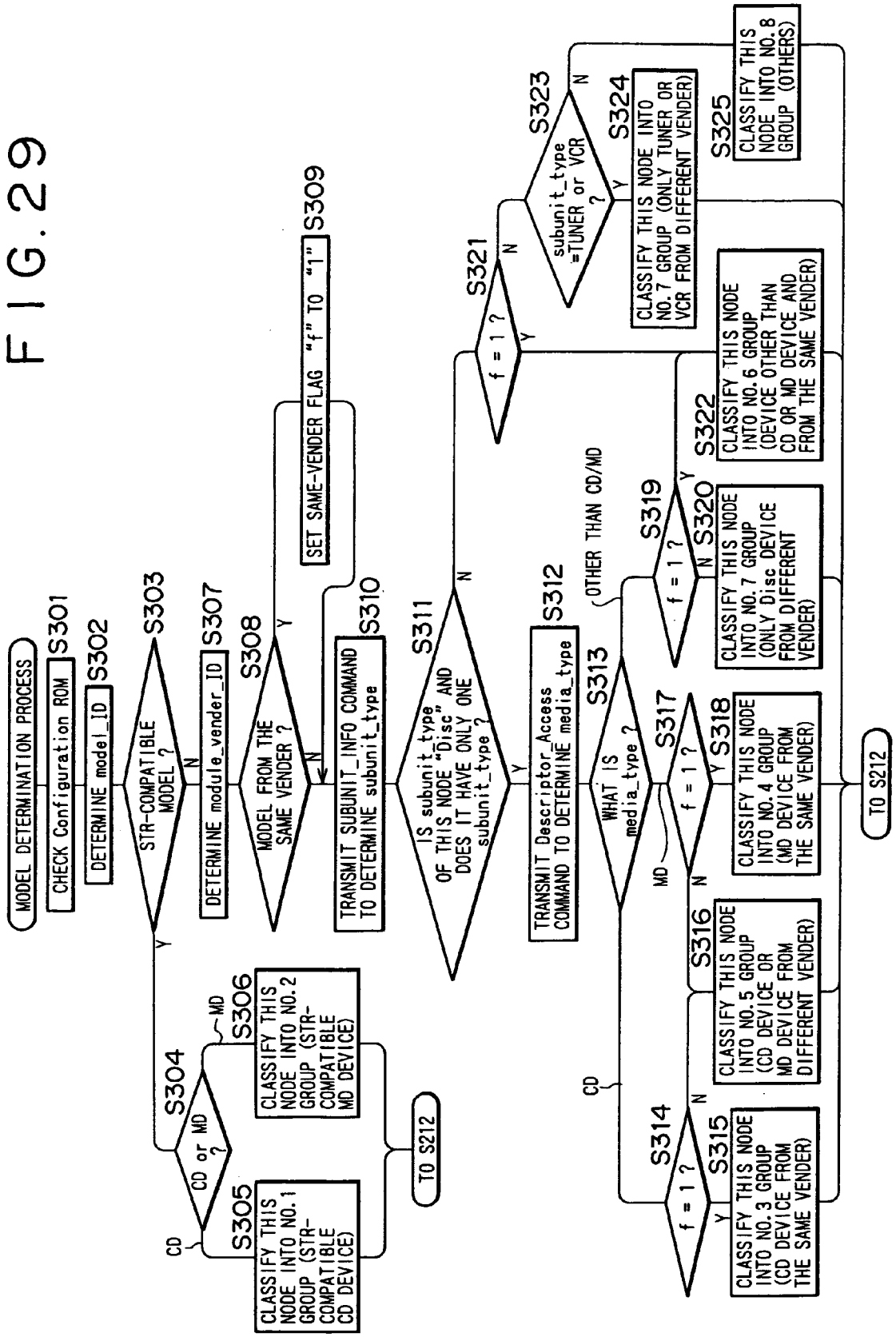
FIG. 29 is a flowchart of steps constituting a model determination process.

The node classification process is performed by the STR 60 upon generation of a bus reset that has triggered a change in management status of nodes on the IEEE 1394 bus. Flowcharts of FIGS. 28 and 29 show steps constituting the node classification process. For purpose of explanation and illustration, the steps in FIGS. 28 and 29 are assumed to be carried out by the system controller 70 of the STR 60 while the controller is exchanging information with the IEEE 1394 interface 61.

The node classification process is started in step S201 of FIG. 28. In step S201, generation of a bus rest on the IEEE 1394 bus is awaited. Upon detection of a bus reset, step S202 and subsequent steps of the process are reached and carried out.

In step S202, the node ID is set to "0." In step S203, a value "0" is set to a variable "i" ($i \geq 0$) corresponding to the node ID of the node currently selected as a target whose model is to be identified (referred to as the current node hereunder). Also in step S203, a value "n" is set as the number of nodes other than this node which are attached to the IEEE 1394 bus. In other words, steps S202 and S203 when carried out amount to an initialization process relevant to the node classification process.

In step S204, a check is made to see if the current variable "i" is less than the number "n" of nodes other than this node. That is, it is determined whether all nodes other than this node on the IEEE 1394 bus have completed the node classification process, to be described from now on. If the variable "i" is judged to be less than the number "n," step S205 is reached.

In step S205, the node ID given by the current variable "i" is counted. Illustratively, when step S205 is reached for the first time, the node ID is counted as "0" and any node having the node ID of "0" is subject to model determination.

In step S206, the node unique ID of the node selected as the current node in step S205 is determined. The node unique ID is recognized by referring to the configuration ROM (FIG. 15E) of the node in question. Illustratively, the system controller 70 gains access to the address of the node in order to retrieve contents of its configuration ROM.

In step S207, any node (device) having the same node unique ID as that determined in step S206 is detected from a node table set prior to the bus reset. The node table is a table that contains results of the classification of devices as nodes on the IEEE 1394 bus. A bus table with new contents is created every time a bus reset is generated.

In step S208, a check is made to see if any device is detected which has the same node unique ID following step S207. If any applicable device is detected, step S209 is reached.

In step S209, information about the newly detected node having the node unique ID in question is retrieved from the node table in effect before the bus reset. The retrieved information is set to a newly created node table. That is, the information about the nodes already attached to the IEEE 1394 bus prior to the bus reset is used just as it is found in the old node table, i.e., without undergoing a model determination process to be described later.

In step S210, the variable "i" is incremented by 1. Step S210 is followed by step S204. The process of incrementing the variable "i" amounts to a process of changing the current node whose model is to be determined in keeping with the ascending order of node ID numbers.

If no applicable device is detected in step S208 (i.e., negative result from the check), step S211 is reached in which a model determination process is performed. This process is carried out to determine the model of the device (node) in question as a basis for eventual node classification. When the model determination process has yielded its results, each device of interest is classified eventually into one of the eight groups described above.

FIG. 29 shows detailed steps constituting the model determination process of step S211. In step S301 of FIG. 29, contents of the configuration ROM are checked. In step S302, a model_ID held as a subunit ID in the configuration ROM is detected.

With the model_ID detected for eventual node model identification, a check is made in step S303 to determine if the node in question is an STR-compatible device. If the result of the check in step S303 is affirmative, step S304 is reached.

This embodiment makes it possible at least to determine, given the model_ID, whether the device in question is an STR-compatible device and whether it is a CD device, an MD device or an STR. In step S304, a check is made to see if the STR-compatible device is a CD device or an MD device. If the device in question is judged to be a CD device, step S305 is reached in which the current node is classified into No. 1 group.

If the device in question is judged to be an MD device, step S306 is reached in which the current node is classified into No. 2 group. At the end of step S305 or S306, step S212 of FIG. 28 is reached again.

If the result of the check in step S303 is negative, step S307 is reached. Step S307 is carried out to detect from the configuration ROM a module_vender_ID of the node as a subunit ID. With the module_vender_ID detected for vender identification, a check is made in step S308 to see whether the current node comes from the same vender as that of the STR 60. If the current node is not judged to be from the same vender, step S310 is reached. If in step S308 the current node is judged to be from the same vender, step S309 is reached in which a same-vender flag "f" is set to "1." Step S309 is followed by step S310. If the same-vender flag "f" is found to be "0," that means the current node is from a different vender; the flag of "1" signifies that the node comes from the same vender.

In step S310, a SUBUNIT_INFO command (STATUS) is transmitted to the current node. The SUBUNIT_INFO command is used to report what the subunit_type is in AV/C commands. Upon receipt of the transmitted SUBUNIT_INFO command (STATUS), the current node returns a response. The contents of the response are checked for subunit_type identification.

Given the result of the subunit_type identification, a check is made in step S311 to see whether the current node has a subunit_type of "disc" (disc recorder/player) and whether it has only one subunit_type. If the result of the check in step S311 is affirmative, step S312 and subsequent steps are reached and performed.

In step S312, a descriptor_access command (OPEN DESCRIPTOR command, READ DESCRIPTOR command) requesting a subunit identifier descriptor is transmitted to the current node. Upon receipt of the command, the current node returns a response whose contents are checked to determine the media_type of the current node.

The OPEN DESCRIPTOR command or READ DESCRIPTOR command as a descriptor_access command is one of the AV/C commands; the command is used to read the descriptor of the node in question. The subunit identifier descriptor describes in an AV/C protocol-compatible format management information about the disc media with which the node is compatible. Media_type information is stored in correspondence with a predetermined location within a data structure of the node. When the subunit_type is "disc," the media_type indicates the type of the disc in question. Illustratively, the media_type indicates whether the disc is a CD, an MD, or any other disc media.

After transmission of the descriptor_access command, the receiving node returns a response including part or all of the subunit identifier descriptor held by that node. In step S312, the transmission of the READ DESCRIPTOR command is followed by receipt of the response from the current node, whereby contents of the media_type described in the subunit identifier descriptor of the response are determined.

In step S313, a check is made to see what the determined media_type is. If the media_type is judged to be CD, step S314 is reached; if the media_type turns out to be MD, step S317 is reached; if the media_type proves to be something other than CD or MD; step S319 is reached.

In step S314, a check is made to see if the same-vender flag "f" is set to be "1." If the flag "f" is found to be "1," the node in question is judged to be a CD device from the same vender as that of the STR 60. In that case, step S314 is followed by step S315 in which the node is classified into No. 3 group. If in step S314 the flag "f" is not judged to be "1," the node is judged to be a CD device from a different vender. In that case, step S314 is followed by step S316 in which the node is classified into No. 5 group.

In step S317, a check is made to see if the same-vender flag "f" is set to "1." If the result of the check in step S317 is affirmative, the node is judged to be an MD device from the same vender. In that case, step S317 is followed by step S318 in which the node is classified into No. 4 group. If in step S317 the flag "f" is not "1," that means the node is an MD device from a different vender. In that case, step S317 is followed by step S316 in which the node is classified into No. 5 group.

In step S319, a check is made to see if the same-vender flag "f" is set to "1." If the result of the check in step S319 is negative, then step S320 is reached in which the node is classified into No. 7 group. In this case, the node is judged to be a disc type device (subunit_type=disc), which is other than a CD or MD device from a different vender and whose subunit is a disc device, a tuner or a VCR in No. 7 group.

If in step S319 the flag "f" is judged to be "1," then step S322 is reached in which the node is classified into No. 6 group as a disc type device (subunit_type=disc) which is other than a CD or MD device and which comes from the same vender.

If the result of the check in step S311 is negative, step S321 is reached. The negative result of the check in step S311 signifies that the current node is other than a disc device (subunit_type) and has one subunit_type or that the current node has a plurality of subunit_types. A node having a plurality of subunit_types is illustratively a hybrid device integrating at least two of such output sources as a CD player, an MD recorder/player and a tuner.

In step S321, a check is also made to see if the same-vender flag "f" is set to "1." If the result of the check in step S321 is affirmative, that means the node is a device other than a CD or MD device and which comes from the same vender. In that case, step S321 is followed by step S322.

If the result of the check in step S321 turns out to be negative, step S323 is reached. In step S323, a check is made to see if the subunit_type of the node is "tuner" or "VCR." That is, it is determined whether the current node has only a tuner or a VCR as its subunit. If the result of the check in step S323 is affirmative, step S324 is reached in which the node is judged to be a device composed of only a tuner or a VCR from a different vender. That is, the current node is classified into No. 7 group as a device other than a CD or MD device, which comes from a different vender, and whose subunit is one of a disc device, a tuner and a VCR.

If the result of the check in step S323 is negative, then the node is judged to be unapplicable to any of No. 1 through No. 7 groups when classified. In that case, step S325 is reached in which the node is classified into No. 8 group.

Following execution of steps S315, S316, S318, S320, S322, S324 and S325 in the classification process, step S212 in FIG. 28 is reached.

In step S212 of FIG. 28, node information about the current node derived from the results of steps S315, S316, S318, S320, S322, S324 and S325 is set to a node table created anew with regard to the current bus reset. In step S213, the variable "i" is incremented by 1; if the same-vender flag "f" is found to be "1," the flag is reset to "0," before step S204 is reached.

Steps S205 through S213 are repeated until the result of the check in step S204 becomes negative. The processing allows each of the nodes on the IEEE 1394 bus to be classified following the most recent bus reset, so that node information is set anew to the node table.

Upon completion of the classification of all nodes and following a negative outcome of the check in step S204, step S214 is reached. In step S214, the node table prepared by the steps performed so far is placed illustratively into a RAM. Thereafter, system operations are suitably carried out by referencing the results of the node classification retained in the node table. The node classification results are also utilized in executing synchronized power-on/off control, to be described below.

4. Transaction Processing 4-1. Basic Rules of Transactions

The transaction rules under the IEEE 1394 have been outlined above with reference to FIGS. 14 and 19. The rules will now be described in more detail by referring to FIGS. 30 and 31.

Figure 30:
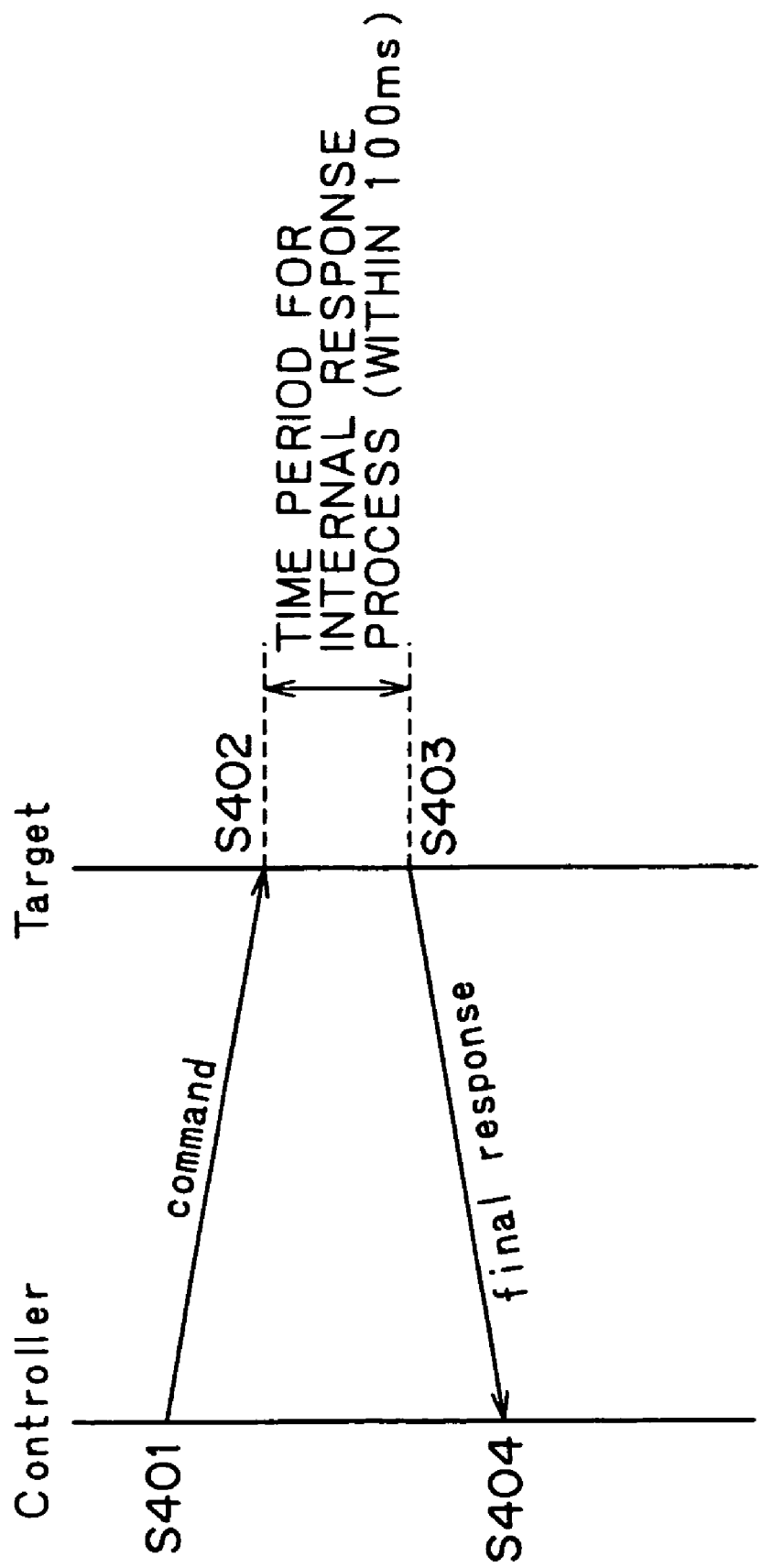
FIG. 30 is a process transition diagram showing how a transaction takes place normally between a controller and a target device.

FIG. 30 shows how a controller typically communicates with a target by basic transaction rules. In step S401, as illustrated, the controller sends an AV/C command to the target. The target receives the transmitted command in step S402.

According to the IEEE 1394 transaction rules, the target is to perform a process corresponding to the command within 100 ms of its receipt and to return a type of response applicable to the result of the process. The type of response (i.e., response code) to be returned may consist of any of the response codes listed in FIG. 21 except for those of INTERIM and CHANGED.

The listed response codes such as NOT IMPLEMENTED, ACCEPTED and REJECTED with the exception of INTERIM and CHANGED are each called the final response.

After sending the command in step S401, the controller waits for a response to be returned by the target. In step S403 of FIG. 30, the target transmits the response. The response is received by the controller in step S404.

Upon receipt of the final response in step S404, the controller regards the command transmission/reception transaction initiated in step S401 as complete. The controller then proceeds to another process such as transmission of a new command.

If the target receives a command in a busy state necessitated by an ongoing process, the target cannot internally respond to the command within 100 ms of its receipt and is incapable of returning a final response during that 100-ms period. In order to avert such a bottleneck, the IEEE 1394 stipulates that a transaction process sketched in FIG. 31 be carried out.

Figure 31:
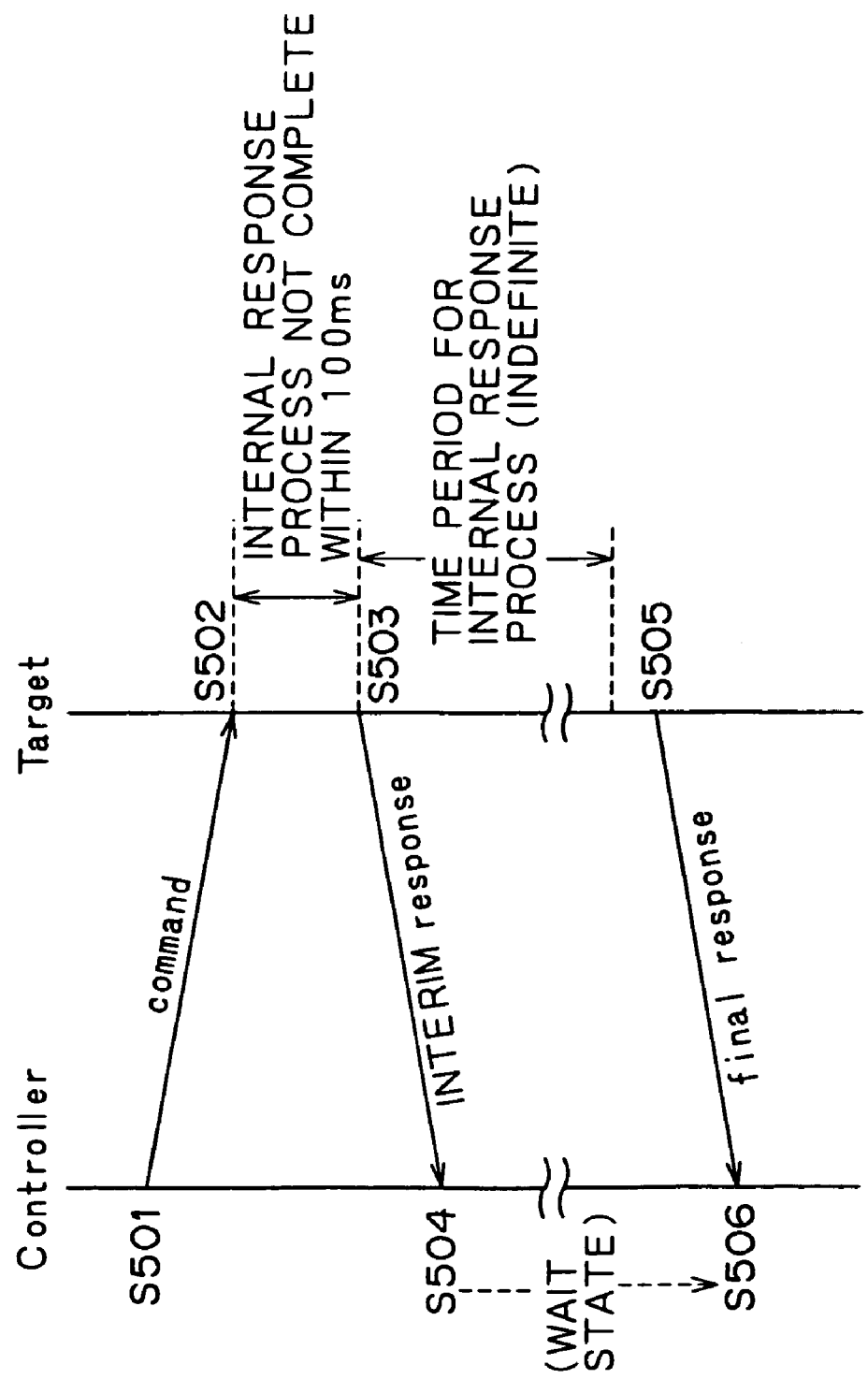
FIG. 31 is a process transition diagram sketching how a transaction takes place between the controller and the target device when a final response cannot be returned by the target within a predetermined time period.

In step S501 of FIG. 31, the controller sends an AV/C command and waits for a response to be returned. The transmitted command is received by the target in step S502.

Suppose now that the target cannot internally respond to the command within 100 ms of its receipt in step S502 and is incapable of transmitting a final response. In that case, the target is arranged to transmit an INTERIM response in step S503 within 100 ms of the reception of the command.

It is stipulated that the INTERIM response be returned by the target to the controller if the target is expected to take 100 ms or longer to return a final response to the controller.

After transmitting the INTERIM response, the target starts internally responding to the received command as soon as it can do so. When the internal response process is completed, the target sends in step S505 a response having a response code reflecting the result of the internal process.

There are no restrictions on the time it takes the target to send the final response following transmission of the INTERIM response.

On the other hand, if the controller receives the INTERIM response from the target in step S504, the controller then waits for a final response to be transmitted. In the wait state, the controller basically does nothing to prepare for any ensuing transaction.

When the target returns the final response at the end of a certain period of time in step S505 as explained above, the controller receives the returned response in step S506. The receipt of the final response completes a single transaction started in step S501.

It should be noted that if the transaction takes place as sketched in FIG. 31, the controller obviously delays proceeding to the next process.

Illustratively in the AV system of FIG. 1, the STR 60 may send commands successively to devices attached to the IEEE 1394 bus so that these devices will perform operations cooperatively under remote control to accomplish a coordinated system action. In such a case, if any one of the transactions involved takes longer than usual to complete, then the time required to complete the transmission of the commands to all devices under control (i.e., transactions) is that much prolonged. This will delay completing any cooperative action of the system and frustrate the user with a ponderous operating environment of the system.

4-2. Transaction Processing of the Embodiment

According to one aspect of the invention, the controller device performs transactions in such a manner (to be described below) that if a given target is unable to return a final response within the predetermined time period of 100 ms, the transaction with that target is arranged to be completed anyway in the shortest possible time. This makes it possible to complete coordinated actions of the system such as those described above at high speed.

One way to implement the above aspect of the invention illustratively involves causing the STR 60 in the system of FIG. 1 synchronously to turn on and off the main power of other devices on the IEEE 1394 bus under remote control. Synchronized power-on/off control is executed only by the STR 60 on STR-compatible devices (STR-compatible CD device 30, STR-compatible MD device 1). That is, main power control is carried out as a coordinated action of the system comprising STR-compatible devices.

According to the IEEE 1394 transaction rules, the IEEE 1394 interface is provided with a POWER CONTROL command as an AV/C command for main power-on/off control.

Figure 33:
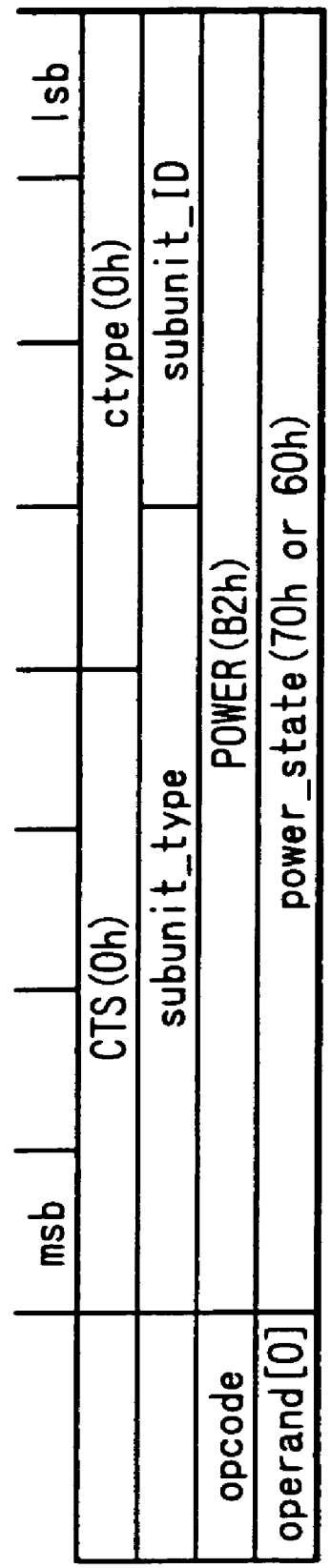
FIG. 33 is a view depicting a typical data structure of a POWER CONTROL command.

FIG. 33 shows a typical data structure of the POWER CONTROL command. This figure indicates contents of the datafield in the write request packet (AV/C command packet) shown in FIG. 20. What was already discussed in reference to FIG. 20 will not be described further.

As shown in FIG. 33, the POWER CONTROL command identifies itself as an AV/C CONTROL command by filling its four-bit CTS region and its four-bit ctype region with '0'h each. The eight-bit opcode region has 'B2'h set therein as an indication of a POWER command. These settings combine to show that this AV/C command packet is a POWER CONTROL command.

The eight-bit operand [0] region following the opcode is filled with a power_state value indicative of the power supply state under control. The power_state value is either '70'h or '60'h as shown in FIG. 33. The value '70'h stands for a power-on state while '60'h denotes a power-off state. That is, a POWER CONTROL command with '70'h set in its operand [0] region requests application of power; a POWER CONTROL command with '60'h set in its operand [0] region orders removal of power.

Figure 32:
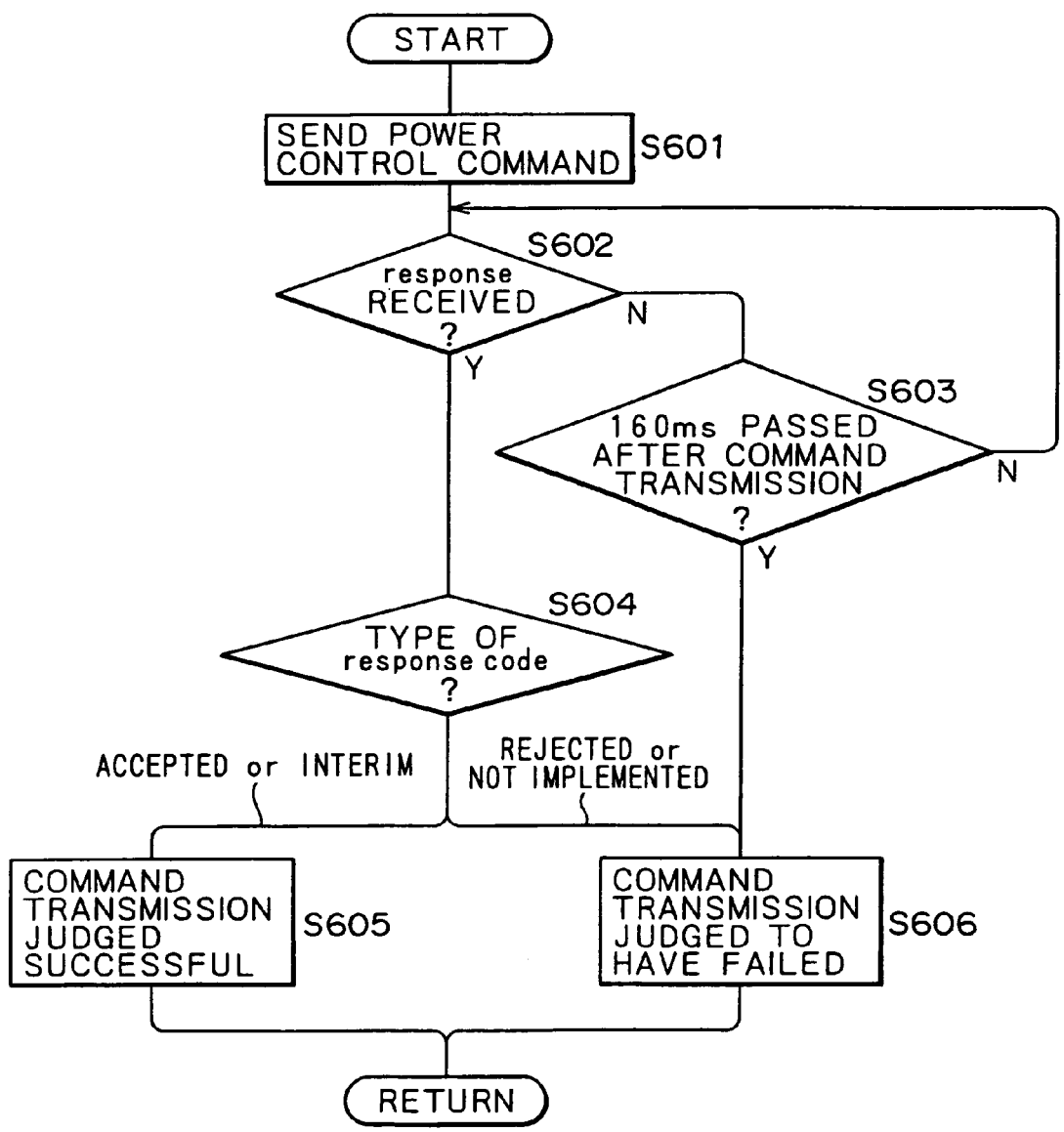
FIG. 32 is a flowchart of steps performed by the controller in executing a transaction.

FIG. 32 shows steps carried out by the STR 60, more specifically by its remote controller 70, in a single transaction to send a POWER CONTROL command for power-on/off control. One transaction is performed with regard to one target device under remote control. The transaction is repeated for each of the STR-compatible devices subject to remote control. In the transactions, the STR 60 serves as the controller and the STR-compatible devices act as a target each. Where commands are to be transmitted and responses to be returned, it is the system controller 70 that causes the IEEE 1394 interface 61 to execute necessary operations.

As mentioned above, main power-on/off control is applied to the STR-compatible CD device 30 and STR-compatible MD device 1. In implementing main power-on/off control, the node table created by the above-described node classification process is referenced so that relevant commands will be sent to those nodes (devices) classified into No. 1 group (i.e., STR-compatible CD device) and No. 2 group (STR-compatible MD device).

In step S601 of FIG. 32, the IEEE 1394 interface 61 transmits a POWER CONTROL command designating activation or deactivation of the main power. In step S602, a check is made to see if any response is received.

If the result of the check in step S602 is negative with no response received, step S603 is reached. In step S603, a check is made to see if a time period of 160 ms has elapsed since the transmission of the command in step S601. The time period of 160 ms is decided on in view of the stipulated period of 100 ms within which an STR-compatible device serving as a target should return a response after receipt of a command. The time period of 160 ms, somewhat longer than the reference period of 100 ms, is established with time lags during command transmission and reception taken into account.

If the result of the check in step S603 is negative, then step S602 is reached again. If the checked result in step S603 is affirmative, step S606 (to be described later) is reached.

Steps S602 and S603 are repeated until a response is received within 160 ms after transmission of the command. When the result of the check in step S602 has thus become affirmative, step S604 is reached.

If the transmitted command is a POWER CONTROL command and if the target returns a final response, then the response consists of any one of the response codes of ACCEPTED, REJECTED, and NOT IMPLEMENTED. If the target is incapable of internally responding to the received POWER CONTROL command within the stipulated 100-ms period, the target returns an INTERIM response as described earlier with reference to FIG. 31. A check in step S604 is then carried out to determine what response code was received in step S602.

If in step S604 the response code is judged to be an ACCEPTED or INTERIM response, step S605 is reached. In step S605, the command transmission is judged to be successful and this routine is terminated. This means that the transaction initiated by transmission of the command in step S601 is now completed.

With this embodiment of the invention, a transaction is judged to be complete by the IEEE 1394 criteria not only when the ACCEPTED response is received as the final response but also when the INTERIM response is received. Thereafter, the system controller 70 of the STR 60 can illustratively send a new POWER CONTROL command to another STR-compatible device serving as the next target.

That a target has returned an INTERIM response signifies the reception of a command by that target. From that point onward, the target is expected to carry out a suitable internal response process. Upon receipt of the INTERIM response, this embodiment is arranged to conclude the ongoing transaction without waiting for a final response that may arrive afterward. The arrangement makes it possible to eliminate a final response wait time, i.e., a time period in which the exact timing of the final response coming in cannot be determined following reception of the INTERIM response. This in turn helps shorten the time it takes to perform each transaction.

If in step S604 the response is judged to consist of any one of the response codes of REJECTED and NOT IMPLEMENTED, then step S606 is reached. If the result of the check in step S603 is affirmative, step S606 is reached as well.

In step S606, the command transmission is judged to have failed and this routine is terminated. That is, the transaction is completed following the outcome of the transaction amounting to a command transmission error. In this case, too, the system controller 70 is allowed to proceed to the next job to be done.

If step S606 is reached from step S604, the transaction is completed normally according to the IEEE 1394 interface criteria, given the fact that the final response of REJECTED or NOT IMPLEMENTED has been obtained. The REJECTED response indicates that an internal response process corresponding to the received command has been rejected; the NOT IMPLEMENTED response signifies that the target has no function suitable for implementing an internal response process relevant to the received command.

If step S606 is reached from step S603, that means no response is received within 160 ms since the transmission of the command. This is regarded as a command transmission error.

That is, the embodiment is arranged to terminate the transaction by recognizing a transmission error in case no response is received during a predetermined time period following transmission of a command; the receipt of a final response is not awaited before the transaction is judged to be erroneous and thus terminated.

If no response is acquired within 160 ms after transmission of a command, that means the target is unable to return a response at least 100 ms after receipt of the command. In other words, for some reason the target is incapable of transmitting any response in an error state. In such a case, the controller can terminate the transaction by recognizing a command transmission error without causing any appreciable problem in system operation.

By taking such action, the controller can complete the transaction in about the same time as when the target normally returns a final response within 100 ms; the controller has no need to wait for a response that the target in the error state is unable to provide.

When the controller performs the steps shown in FIG. 32, power-on/off control illustratively effected by the STR 60 on numerous devices is completed in the shortest possible time. The execution of transactions by the controller as embodied above is particularly effective when applied to cases where commands are transmitted successively to a large number of devices as in synchronized control over a plurality of devices explained earlier.

In the above embodiment, when the controller sends a power-on/off command to the target device, the controller can terminate the process or proceed to another task upon receipt of an INTERIM response from the target; the controller is not required to wait for reception of a final response from the target device.

In particular, where a power-off command is transmitted to the target device, there is no problem with the controller proceeding to perform another process in connection with a different target device regardless of the status of the current target device. Generally, there is little possibility that a new command will be sent to the target device once power-off status has been designated for that device.

Although the execution of transactions by the embodiment of this invention has been shown addressing main power-on/off control, this is not limitative of the invention. Alternatively, the invention may be practiced illustratively to permit synchronized control of dubbing from the STR-compatible CD device 30 to the STR-compatible MD device 1 or to provide coordinated control of display brightness levels on different devices. Furthermore, although the STR 60 has been shown carrying out transactions only with the STR-compatible devices, this is not limitative of the invention. Alternatively, the inventive scheme applies as well to target devices not STR-compatible but coming from the same vender or to other devices coming from different venders.

Although the embodiment above embraces the AV system of FIG. 1 as a typical system applicable to this invention, this is not limitative of the invention. The invention applies to many other systems.

The invention is not limited to the IEEE 1394 interface alone; it applies effectively to other data interfaces whose criteria stipulate that a provisional response equivalent to the INTERIM response be transmitted in comparable circumstances.

As described and according to the invention, where data are transmitted and received through a data interface such as the IEEE 1394 interface, a device acting as a controller sends out a command in a command transmission/reception transaction and, upon receipt of an INTERIM response, regards the transaction as complete. If no response is received during a predetermined time period following transmission of the command, the controller considers the command transmission/reception transaction has failed and regards the transaction as complete.

The point is that if an INTERIM response is received or if no response is obtained within a predetermined time period, the controller proceeds to terminate the transaction without waiting for the receipt of a final response.

Acting as it does, the controller can go on to another task to be performed without having to wait for a final response from the target. This means that a system having multiple devices interconnected via a data bus can perform various operations in the shortest possible time. That is, the system adopting the inventive scheme improves its performance by having coordinated system-wise actions accomplished at higher speeds than before, thereby providing users with a brisk, stress-free operating environment.

As many apparently different embodiments of this invention may be made without departing from the spirit and scope thereof, it is to be understood that the invention is not limited to the specific embodiments thereof except as defined in the appended claims.

What is claimed is:

1. An electronic device system having a controlling device and a controlled device interconnected via a data bus which complies with a predetermined communication format and which allows data to be exchanged between the devices, said electronic device system comprising:
   means for causing said controlling device to transmit a command to said controlled device over said data bus in a transaction;
   means for allowing said controlling device to receive a response returned within a first predetermined period by said controlled device over said data bus in response to the transmitted command during said transaction;
   means for judging whether the response received by said controlling device is an interim response corresponding to when said controlled device determines that the transmitted command has been received and that a transmission of a final response is impossible within a second predetermined period less than the first predetermined period; and
   means for immediately terminating said transaction without waiting for reception of said final response from said controlled device if said judging means judges the response received by said controlling device to be said interim response, said means for terminating including means for recognizing a command transmission error when said controlling device does not receive a response within said first predetermined period.

2. The electronic device system according to claim 1, wherein said data bus complying with said predetermined communication format is an IEEE 1394 bus.

3. The electronic device system according to claim 1, wherein the command transmitted by said controlling device to said controlled device over said data bus is a power-on/off command.

4. A controlling device connected to a controlled device via a data bus which complies with a predetermined communication format and which allows data to be exchanged between the devices, said controlling device comprising:
   means for transmitting a command to said controlled device over said data bus in a transaction;
   means for receiving a response returned by said controlled device over within a first predetermined period by said data bus in response to the transmitted command during said transaction;
   means for judging whether the response received by said receiving means is an interim response corresponding to when said controlled device determines that the transmitted command has been received and that a transmission of a final response is impossible within a second predetermined period less than the first predetermined period; and means for immediately terminating said transaction without waiting for reception of said final response from said controlled device if said judging means judges the response received by said receiving means to be said interim response, said means for terminating including means for recognizing a command transmission error when said controlling device does not receive a response within said first predetermined period.

5. The controlling device according to claim 4, wherein said data bus complying with said predetermined communication format is an IEEE 1394 bus.

6. The controlling device according to claim 4, wherein the command transmitted by said controlling device to said controlled device over said data bus is a power-on/off command.

7. A controlling method for use with a controlling device connected to a controlled device via a data bus which complies with a predetermined communication format and which allows data to be exchanged between the devices, said controlling method comprising the steps of:

causing said controlling device to transmit a command to said controlled device over said data bus in a transaction;

allowing said controlling device to receive a response returned within a first predetermined period by said controlled device over said data bus in response to the transmitted command during said transaction;

judging whether the response received by said controlling device is an interim response corresponding to when said controlled device determines that the transmitted command has been received and that a transmission of a final response is impossible within a second predetermined period less than the first predetermined period; and immediately terminating said transaction without waiting for reception of said final response from said controlled device if the response received by said controlling device is judged to be said interim response in said judging step, said step of terminating including a step of recognizing a command transmission error when said controlling device does not receive a response within said first predetermined period.

8. The controlling method according to claim 7, wherein said data bus complying with said predetermined communication format is an IEEE 1394 bus.

9. The controlling method according to claim 7, wherein the command transmitted by said controlling device to said controlled device over said data bus is a power-on/off command.

* * * * *

UNITED STATES PATENT AND TRADEMARK OFFICE
CERTIFICATE OF CORRECTION

PATENT NO.       : 7,191,267 B2
APPLICATION NO.  : 09/797872
DATED            : March 13, 2007
INVENTOR(S)      : Takuro Noda et al.

It is certified that error appears in the above-identified patent and that said Letters Patent is hereby corrected as shown below:

Column 23, line 59, please change "OPCR" to --oPCR--;

line 64, please change "OPCR" to --oPCR--.

Column 26, line 9, change "0000" to --00000--;

line 10, change "0000" to --00001--;

line 10, change "0001" to --00010--;

same line, change "0001" to --00011--;

line 11, change "0010" to --00100--;

same line, change "0010" to --00101--;

line 12, change "0111" to --00111--;

same line, change "1000" to --01000--;

same line, change "1111" to --11110--;

line 13, change "1111" to --11111--.

Signed and Sealed this

Sixth Day of November, 2007

JON W. DUDAS
*Director of the United States Patent and Trademark Office*